(12) United States Patent
Saegusa et al.

(10) Patent No.: US 7,067,075 B2
(45) Date of Patent: Jun. 27, 2006

(54) FLAME-RETARDANT THERMOPLASTIC RESIN COMPOSITION

(75) Inventors: Kazunori Saegusa, Osaka (JP); Tomomichi Hashimoto, Osaka (JP); Hiroshi Tsuneishi, Osaka (JP); Nobuo Miyatake, Hyogo (JP); Hiroshi Tone, Hyogo (JP); Akira Takaki, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/483,101

(22) PCT Filed: Apr. 25, 2003

(86) PCT No.: PCT/JP03/05325

§ 371 (c)(1),
(2), (4) Date: Jun. 24, 2004

(87) PCT Pub. No.: WO03/091342

PCT Pub. Date: Nov. 6, 2003

(65) Prior Publication Data

US 2004/0220302 A1 Nov. 4, 2004

(30) Foreign Application Priority Data

Apr. 26, 2002 (JP) ............... 2002-126918
Nov. 8, 2002 (JP) ............... 2002-325870

(51) Int. Cl.
*C09K 21/14* (2006.01)
*C08K 5/435* (2006.01)
*C08K 5/42* (2006.01)

(52) U.S. Cl. ............ 252/609; 523/201; 523/334; 524/157; 524/158; 524/159; 524/161; 524/162; 524/163; 524/164; 524/165; 524/166

(58) Field of Classification Search ............... None
See application file for complete search history.

(56) References Cited

U.S. PATENT DOCUMENTS

| | | | |
|---|---|---|---|
| 4,265,801 A | | 5/1981 | Moody et al. |
| 4,387,176 A | | 6/1983 | Frye |
| 4,939,205 A | * | 7/1990 | Derudder et al. ............ 525/63 |
| 5,025,066 A | * | 6/1991 | DeRudder et al. ............ 525/66 |
| 5,087,662 A | | 2/1992 | Alsmarraie et al. |
| 5,087,667 A | | 2/1992 | Hwo |
| 5,508,323 A | | 4/1996 | Romenesko et al. |
| 6,150,443 A | * | 11/2000 | Nodera et al. ............ 524/157 |
| 6,664,313 B1 | * | 12/2003 | Hirai et al. ............ 523/209 |
| 6,838,502 B1 | * | 1/2005 | Nodera et al. ............ 524/395 |

FOREIGN PATENT DOCUMENTS

| | | |
|---|---|---|
| EP | 0 369 200 A2 | 5/1990 |
| EP | 0 369 202 A2 | 5/1990 |
| EP | 0 369 204 B1 | 5/1990 |
| EP | 0 829 521 A1 | 3/1998 |
| EP | 1 174 466 A1 | 1/2002 |
| EP | 1174466 A1 * | 1/2002 |
| EP | 1 188 792 A1 | 3/2002 |
| EP | 1 338 625 A1 | 8/2003 |
| EP | 1 475 396 A1 | 11/2004 |
| JP | 9-136928 A | 5/1997 |
| JP | 9-136929 A | 5/1997 |
| JP | 2000-17029 | 1/2000 |
| JP | 2000226420 A * | 8/2000 |
| JP | 2000-264935 | 9/2000 |
| JP | 2001-200152 A | 7/2001 |
| JP | 2001200152 A * | 7/2001 |
| JP | 2002-348457 A | 12/2002 |
| JP | 2002-371160 A | 12/2002 |
| JP | 2003-12910 A | 1/2003 |
| JP | 2003-89749 A | 3/2003 |
| WO | WO 01/07520 A1 * | 2/2001 |

OTHER PUBLICATIONS

JPO machine translation of JP 2001-200152-A.*
JPO machine translation of JP 2003-089749-A.*
Supplementary European Search Report from Application No. EP 03 72 7989, Apr. 20, 2005, 4 pages.
International Search Report From Corresponding International Application No. PCT/JP03/05325, Dated Sep. 2, 2003, 2 Pages.

* cited by examiner

*Primary Examiner*—Matthew A. Thexton
(74) *Attorney, Agent, or Firm*—Brinks Hofer Gilson & Lione

(57) ABSTRACT

The object of the present invention is to provide
a flame-retardant thermoplastic resin composition, which comprises:
100 parts by weight of a thermoplastic resin (A),
0.1 to 30 parts by weight of a polyorganosiloxane-containing graft copolymer (B) obtained by polymerizing, in at least one stage, a monomer (B-3) comprising a polyfunctional monomer (B-2) containing at least two polymerizable unsaturated bonds within the molecule thereof, and/or a vinyl monomer (B-4) in the presence of polyorganosiloxane particles (B-1),
0.0005 to 5 parts by weight of at least one metal salt (C) selected from the group consisting of alkali metal salts and bivalent or further polyvalent metal salts, and
0.05 to 2 parts by weight of a fluororesin (D).

19 Claims, No Drawings

FLAME-RETARDANT THERMOPLASTIC RESIN COMPOSITION

RELATED APPLICATIONS

This application is a nationalization of PCT Application No. PCT/JP03/05325 filed Apr. 25, 2003. This application claims priority from Japanese Patent Application No. 2002-126918 filed on Apr. 26, 2002 and Japanese Patent Application No. 2002-325870 filed on Nov. 8, 2002.

FIELD OF THE INVENTION

The present invention relates to a flame-retardant thermoplastic resin composition.

BACKGROUND ART

Thermoplastic resins, in particular polycarbonate-based resins, are widely used in or as electric/electronic parts, OA equipment, domestic articles or building materials owing to their good impact resistance, heat resistance, and electric characteristics, among others. Whereas polycarbonate-based resins have higher flame retardancy as compared with polystyrene resins and the like, there are fields in which a still higher level of flame retardancy is required, mainly in the fields of electric/electronic parts, OA equipment, and the like. Thus, improvements in such flame retardancy have been attempted by addition of various flame retardants. For example, the addition of organohalogen compounds and organophosphorus compounds is conventional in the art. However, most of organohalogen compounds and organophosphorus compounds have a problem concerning toxicity and, in particular, organohalogen compounds have a problem in that, upon combustion, they generate corrosive gases. Under such circumstances, the demand for halogen-free and phosphorus-free flame retardants for rendering such resins flame-retardant has been increasing in recent years.

The utilization of polyorganosiloxane compounds (also called silicones) as halogen-free, phosphorus-free flame retardants has been proposed. For example, Japanese Kokai Publication Sho-54-36365 describes that flame-retardant resins can be obtained by kneading together a silicone resin comprising monoorganopolysiloxane and a nonsilicone polymer.

Japanese Kokoku Publication Hei-03-48947 describes that mixtures of a silicone resin and a group IIA metal salt confer flame retardancy upon thermoplastic resins.

Japanese Kokai Publication Hei-08-113712 describes a method of obtaining flame-retardant resin compositions by dispersing, in a thermoplastic resin, a silicone resin prepared by mixing up 100 parts by weight of a polyorganosiloxane and 10 to 150 parts by weight of a silica filler.

Japanese Kokai Publication Hei-10-139964 describes that flame-retardant resin compositions can be obtained by adding a solvent-soluble silicone resin having a weight average molecular weight of not less than 10,000 but not more than 270,000 to a nonsilicone resin containing aromatic ring.

However, the silicone resins described in the above-cited documents are effective in conferring flame retardancy only to an unsatisfactory extent. An increase in the amount of flame retardant for attaining satisfactory results will cause deterioration in impact resistance of the resulting resin compositions and, thus, there is still a problem such that it is difficult to obtain resin compositions with both excellent flame retardancy and good impact resistance.

Japanese Kokai Publication 2000-17029 describes that flame-retardant resin compositions can be obtained by incorporating in a thermoplastic resin a composite rubber type flame retardant resulting from graft-polymerizing a vinyl monomer onto a composite rubber composed of a polyorganosiloxane rubber and a poly(alkyl (meth)acrylate) rubber.

Japanese Kokai Publication 2000-226420 describes that flame-retardant resin compositions can be obtained by incorporating in thermoplastic resins a polyorganosiloxane type flame retardant resulting from grafting a vinyl monomer onto composite particles comprising a polyorganosiloxane having aromatic group and a vinyl polymer.

Japanese Kokai Publication 2000-264935 describes that flame-retardant resin compositions can be obtained by incorporating in thermoplastic reins a polyorganosiloxane-containing graft copolymer resulting from graft polymerizing a vinyl monomer onto polyorganosiloxane particles not larger than 0.2 µm in size.

The flame-retardant resin compositions described in Japanese Kokai Publication 2000-17029, Japanese Kokai Publication 2000-226420 and Japanese Kokai Publication 2000-264935 all have satisfactory levels of impact resistance but are not satisfactory in flame retardancy. Thus, they still have a problem in that they are not excellent both in flame retardancy and in impact resistance.

Further, while Japanese Kokai Publication 2000-264935 described that the polyorganosiloxane-containing graft copolymer can be recovered in the form of a powder by spray drying, there is no specific example of the composition is given. As far as the investigation made by the present inventors indicates, such a polyorganosiloxane-containing graft copolymer as recovered by spray drying is good in flame retardancy but has another problem, namely it is poor in powder characteristics as compared with the grade of copolymer recovered by salt coagulation, in particular it is unsatisfactory in anti-blocking property.

SUMMARY OF THE INVENTION

It is an object of the present invention to provide a flame-retardant thermoplastic resin composition which is halogen-free and phosphorus-free and excellent both in flame retardancy and impact resistance.

Another object of the invention is to provide a flame retardant for thermoplastic resins which is excellent in anti-blocking property and will never impair the moldability, typically the thermal stability, of the resins.

As a result of intensive investigations made by the present inventors to solve the problems discussed above, it was found that when a specific polyorganosiloxane-containing graft copolymer and a specific metal salt and a fluororesin are combinedly incorporated in a thermoplastic resin, a flame-retardant thermoplastic resin composition excellent in both flame retardancy and impact resistance can be obtained and a flame retardant for thermoplastic resins which is excellent in anti-blocking property and will never impair the thermal stability of the resins can be obtained. Such and other findings have led to completion of the present invention.

Thus, the invention provides:

A flame-retardant thermoplastic resin composition, which comprises:

100 parts by weight of a thermoplastic resin (A), 0.1 to 30 parts by weight of a polyorganosiloxane-containing graft copolymer (B) obtained by polymerizing, in at least one stage, a monomer (B-3) comprising a polyfunctional monomer (B-2) containing at least two polymerizable unsaturated bonds within the molecule thereof, and/or a vinyl monomer (B-4) in the presence of polyorganosiloxane particles (B-1), 0.0005 to 5 parts by weight of at least one metal salt (C) selected from the group consisting of alkali metal salts and bivalent or further polyvalent metal salts, and 0.05 to 2 parts by weight of a fluororesin (D) (Claim 1);

The flame-retardant thermoplastic resin composition according to Claim 1, wherein the thermoplastic resin (A) is a polycarbonate-based resin, the amount of the polyorganosiloxane-containing graft copolymer (B) is 0.5 to 20 parts by weight per 100 parts by weight of the polycarbonate-based resin, the metal salt (C) is an alkali metal salt of a sulfur-containing organic compound and/or a bivalent or further polyvalent metal salt of a sulfur-containing organic compound and the amount thereof in total is 0.001 to 5 parts by weight per 100 parts by weight of the polycarbonate-based resin (Claim 2);

The flame-retardant thermoplastic resin composition according to Claim 2, wherein the metal salt (C) comprises both an alkali metal salt of a sulfur-containing organic compound and a bivalent or further polyvalent metal salt of a sulfur-containing organic compound (Claim 3);

The flame-retardant thermoplastic resin composition according to any one of Claims 1 to 3, wherein the bivalent or further polyvalent metal salt is an alkaline earth metal salt (Claim 4);

The flame-retardant thermoplastic resin composition according to any one of Claims 1 to 4, wherein the polyorganosiloxane-containing graft copolymer (B) is produced by polymerizing, in at least one stage, 0 to 10 parts by weight, per 100 parts by weight of the whole copolymer, of a monomer (B-3) comprising 100 to 20% by weight of a polyfunctional monomer (B-2) containing at least two polymerizable unsaturated bonds within the molecule thereof and 0 to 80% by weight of another copolymerizable monomer (B-5) in the presence of 40 to 95 parts by weight of polyorganosiloxane particles (B-1) and further polymerizing, in at least one stage, 5 to 50 parts by weight of a vinyl monomer (B-4) (Claim 5);

The flame-retardant thermoplastic resin composition according to any one of Claims 1 to 5, wherein the polyorganosiloxane particles (B-1) has a volume average particle diameter of 0.008 to 0.6 µm (Claim 6);

The flame-retardant thermoplastic resin composition according to any one of Claims 1 to 6, wherein the polyorganosiloxane particles (B-1) are produced without using any tri- or further poly-functional silane (Claim 7);

The flame-retardant thermoplastic resin composition according to any one of Claims 1 to 7, wherein the polyorganosiloxane particles (B-1) are in a latex form (Claim 8);

The flame-retardant thermoplastic resin composition according to any one of Claims 1 to 8, wherein the vinyl monomer (B-4) is such one that a polymer derived from that monomer alone has a solubility parameter of 9.15 to 10.15 $(\text{cal/cm}^3)^{1/2}$ (Claim 9);

The flame-retardant thermoplastic resin composition according to any one of Claims 1 to 9, wherein the vinyl monomer (B-4) is at least one monomer selected from the group consisting of aromatic vinyl monomers, vinyl cyanides, (meth)acrylic ester monomers and carboxyl group-containing vinyl monomers (Claim 10);

The flame-retardant thermoplastic resin composition according to any one of Claims 2 to 10, wherein the sulfur-containing organic compound is at least one compound selected from the group consisting of sulfonamides, (alkyl)aromatic sulfonic acids, perfluoroalkanesulfonic acids, aliphatic sulfonic acids and diphenyl sulfone sulfonic acids (Claim 11);

The-flame-retardant thermoplastic resin composition according to any one of Claims 2 to 10, wherein the sulfur-containing organic compound is an (alkyl)aromatic sulfonic acid (Claim 12);

The flame-retardant thermoplastic resin composition according to any one of Claims 1 to 12, which further comprises not more than 2 parts by weight of an antioxidant (E) (Claim 13);

The flame-retardant thermoplastic resin composition according to Claim 13, wherein the antioxidant (E) comprises a combination of at least one antioxidant having the isocyanuric ring structure within the molecule thereof and at least one other antioxidant (Claim 14);

A method of producing the flame-retardant thermoplastic resin composition according to Claim 3, which comprises:

emulsion-polymerizing, in at least one stage, a monomer (B-3) comprising a polyfunctional monomer (B-2) containing at least two polymerizable unsaturated bonds within the molecule thereof, and/or a vinyl monomer (B-4) in the presence of polyorganosiloxane particles (B-1), recovering the resulting polyorganosiloxane-containing graft copolymer containing a bivalent or further polyvalent metal salt of a sulfur-containing organic compound by the coagulation method, and melt-kneading a thermoplastic resin (A), the polyorganosiloxane-containing graft copolymer containing the bivalent or further polyvalent metal salt of the sulfur-containing organic compound, an alkali metal salt of a sulfur-containing organic compound, and a fluororesin (D) together (Claim 15);

A flame retardant for thermoplastic resins, which comprises:

a polyorganosiloxane-containing graft copolymer obtained by polymerizing, in at least one stage, a monomer (B-3) comprising a polyfunctional monomer (B-2) containing at least two polymerizable unsaturated bonds within the molecule thereof, and/or a vinyl monomer (B-4) in the presence of polyorganosiloxane particles (B-1), an alkali metal salt of a sulfur-containing organic compound, and a bivalent or further polyvalent metal salt of a sulfur-containing organic compound (Claim 16); and A method of producing the flame retardant for thermoplastic resins according to Claim 16, which comprises:

emulsion-polymerizing, in at least one stage, a monomer (B-3) comprising a polyfunctional monomer (B-2) containing at least two polymerizable unsaturated bonds within the molecule thereof, and/or a vinyl monomer (B-4) in the presence of polyorganosiloxane particles (B-1), recovering the polyorganosiloxane-containing graft copolymer containing a bivalent or further polyvalent metal salt of a sulfur-containing organic compound by the coagulation method, and blending the polyorganosiloxane-containing graft copolymer containing the bivalent or further polyvalent metal salt of the sulfur-containing organic compound with an alkali metal salt of a sulfur-containing organic compound (claim 17).

In the following, the present invention is described in detail.

DETAILED DISCLOSURE OF THE INVENTION

The flame-retardant thermoplastic resin composition of the invention comprises 100 parts by weight of a thermoplastic resin (A), 0.1 to 30 parts by weight of a polyorganosiloxane-containing graft copolymer (B), 0.0005 to 5 parts by weight of at least one metal salt (C) selected from the group consisting of alkali metal salts and bivalent or further polyvalent metal salts, and 0.05 to 2 parts by weight of a fluororesin (D).

The polyorganosiloxane-containing graft copolymer (B), when incorporated in the thermoplastic resin (A), improves the flame retardancy and impact resistance of the resulting moldings. In accordance with the present invention, the polyorganosiloxane-containing graft copolymer (B) is used in an amount of 0.1 to 30 parts by weight per 100 parts by weight of the thermoplastic resin. At lower addition levels, neither flame retardancy nor impact resistance will be manifested while excessively high levels will unfavorably cause a deterioration in flame retardancy and a lowering of thermal resistance against a temperature of the moldings. Preferably, the addition level is not lower than 0.5 part by weight, more preferably not lower than 0.7 part by weight, still more preferably not lower than 1 part by weight. On the other hand, it is preferably not higher than 20 parts by weight, more preferably not higher than 10 parts by weight, still more preferably not higher than 6 parts by weight, most preferably not higher than 4 parts by weight.

The above-mentioned polyorganosiloxane-containing graft copolymer (B) is obtained by polymerizing, in at least one stage, a monomer (B-3) comprising a polyfunctional monomer (B-2) containing at least two polymerizable unsaturated bonds within the molecule thereof, and/or a vinyl monomer (B-4) in the presence of polyorganosiloxane particles (B-1). It is preferably the product obtained by polymerizing, in at least one stage, 0 to 10 parts by weight, per 100 parts by weight of the whole polyorganosiloxane-containing graft copolymer (B), of a monomer (B-3) comprising 100 to 20% by weight of a polyfunctional monomer (B-2) containing at least two polymerizable unsaturated bonds within the molecule thereof and 0 to 80% by weight of another copolymerizable monomer (B-5) in the presence of 40 to 95 parts by weight of polyorganosiloxane particles (B-1) and further polymerizing, in at least one stage, 5 to 50 parts by weight of a vinyl monomer (B-4).

The polyorganosiloxane particles (B-1) preferably have a volume average particle diameter of not smaller than 0.008 μm, more preferably not smaller than 0.01 μm, still more preferably not smaller than 0.1 μm, as determined by the light scattering method or by observation under an electron microscope. That diameter is preferably not larger than 0.6 μm, more preferably not larger than 0.38 μm, still more preferably not larger than 0.3 μm. While there is a tendency for the production of such particles having a volume average particle diameter smaller than 0.008 μm to become difficult, particle diameters exceeding 0.6 μm tends to lead to deterioration in flame retardancy.

For the flame retardancy and impact resistance, the polyorganosiloxane particles (B-1) preferably have a toluene insoluble matter content (toluene insoluble matter content after 24 hours of immersion of 0.5 g of the particles in 80 ml of toluene at room temperature) of not higher than 95%, more preferably not higher than 50%, in particular not higher than 20%.

The polyorganosiloxane particles (B-1) of the invention conceptually include not only particles made of a polyorganosiloxane alone but also modified polyorganosiloxane particles containing up to 5% by weight of another (co) polymer. Thus, the polyorganosiloxane particles may contain up to 5% by weight of poly(butyl acrylate) and/or a butyl acrylate-styrene copolymer, for instance.

As specific examples of the polyorganosiloxane particles (B-1), there may be mentioned polydimethylsiloxane particles, polymethylphenylsiloxane particles, and dimethylsiloxane-diphenylsiloxane copolymer particles, among others. The polyorganosiloxane particles (B-1) may comprise one single species or a combination of two or more species.

The polyorganosiloxane particles (B-1) can be obtained, for example, by polymerizing (1) an organosiloxane, (2) a bifunctional silane, (3) an organosiloxane and a bifunctional silane, (4) an organosiloxane and a vinyl type polymerizable group-containing silane, (5) an organosiloxane and a silane having a group capable of radical reaction, (6) a bifunctional silane and a vinyl type polymerizable group-containing silane, (7) a bifunctional silane and a silane having a group capable of radical reaction, (8) an organosiloxane, a bifunctional silane and a vinyl type polymerizable group-containing silane, (9) an organosiloxane, a bifunctional silane and a silane having a group capable of radical reaction, or (10) an organosiloxane, a bifunctional silane, a vinyl type polymerizable group-containing silane and a silane having a group capable of radical reaction, or by polymerizing such a monomer or monomers with a tri- or further poly-functional silane further added thereto. The term "bifunctional silane" means a silane in which the total number of hydroxyl group(s) and/or hydrolysable group(s) bound to a silicon atom is 2. The term "tri- or further poly-functional silane" means a silane in which the total number of hydroxyl group(s) and/or hydrolysable group(s) bound to a silicon atom is not smaller than 3.

The organosiloxane and bifunctional silane each is a component constituting the main framework of the polyorganosiloxane chain. As specific examples of the organosiloxane, there may be mentioned hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), and hexadecamethylcyclooctasiloxane (D8). As specific examples of the bifunctional silane, there may be mentioned diethoxydimethylsilane, dimethoxydimethylsilane, diphenyldimethoxysilane, diphenyldiethoxysilane, 3-chloropropylmethyldimethoxysilane, 3-glycidoxypropylmethyldimethoxysilane, heptadecafluorodecylmethyldimethoxysilane, trifluoropropylmethyldimethoxysilane, and octadecylmethyldimethoxysilane. Among these, 70 to 100%, preferably 80 to 100%, of D4, mixtures of D3 to D7, or mixtures of D3 to D8 and 0 to 30%, preferably 0 to 20%, of diphenyldimethoxysilane, diphenyldiethoxysilane and/or the like as the balance component are preferably used from the viewpoint of the good economy and flame retardancy.

The vinyl type polymerizable group-containing silane or the silane having the group capable of radical reaction mentioned above is a component to be copolymerized with the above-mentioned organosiloxane, bifunctional silane, tri- or further poly-functional silane and/or the like for the introduction of the vinyl type polymerizable group or the group capable of radical reaction onto side chains or a terminus of the copolymer. The vinyl type polymerizable group or the group capable of radical reaction serves as an active site for grafting on the occasion of chemically binding to the (co)polymer formed, as mentioned later herein, from a monomer (B-3) comprising a polyfunctional monomer (B-2) containing at least two polymerizable unsaturated bonds within the molecule, and/or a vinyl monomer (B-4). Furthermore, it is a component capable of forming a crosslinking bond between active sites for grafting in the manner of radical reaction by the use of radical polymerization initiator, hence capable of being utilized also as a crosslinking agent. The radical polymerization initiator may be the same one as can be used in the graft polymerization which is to be mentioned later herein. Even when the crosslinking is effected by the radical reaction, some remains as active sites for grafting, hence grafting is possible.

As specific examples of the vinyl type polymerizable group-containing silane or the silane having the group capable of radical reaction, there may be mentioned, among others, (meth)acryloyloxy group-containing silanes such as γ-methacryloyloxypropyldimethoxymethylsilane, γ-methacryloyloxypropyltrimethoxysilane, γ-methacryloyloxypropyltriethoxysilane, γ-methacryloyloxypropyldiethoxymethylsilane, γ-acryloyloxypropyldimethoxymethylsilane and γ-acryloyloxypropyltrimethoxysilane, vinylphenyl group-containing silanes such as p-vinylphenyldimethoxymethylsilane and p-vinylphenyltrimethoxysilane, vinyl group-containing silanes such as vinylmethyldimethoxysilane, vinyltrimethoxysilane and vinyltriethoxysilane, and mercapto group-containing silanes such as mercaptopropyltrimethoxysilane and mercaptopropyldimethoxymethylsilane. Among these, (meth)acryloyloxy group-containing silanes, vinyl group-containing silanes and mercapto group-containing silanes are preferably used because of economical advantage. The vinyl type polymerizable group-containing silanes or silanes having the group capable of radical reaction may be used singly or two or more of them may be used in combination.

When the vinyl type polymerizable group-containing silane is of the trialkoxysilane type, it also serves as such a tri- or further poly-functional silane as mentioned below.

The tri- or further poly-functional silane mentioned above is used as a component to be copolymerized with the above-mentioned organosiloxane, bifunctional silane, vinyl type polymerizable group-containing silane and/or silane having the group capable of radical reaction, among others, for the introduction of crosslinked structures into the polyorganosiloxane to confer thereon elasticity as rubber, namely as a crosslinking agent for the polyorganosiloxane. Alternatively, it is used as a component for increasing the molecular weight of the polyorganosiloxane. As specific examples, there may be mentioned tetraethoxysilane, methyltriethoxysilane, methyltrimethoxysilane, ethyltriethoxysilane, 3-glycidoxypropyltrimethoxysilane, heptadecafluorodecyltrimethoxysilane, trifluoropropyltrimethoxysilane, octadecyltrimethoxysilane, and like tetrafunctional and trifunctional alkoxy silanes. Among these, tetraethoxysilane and methyltriethoxysilane are preferably used because of high crosslinking efficiency.

The organosiloxane, bifunctional silane, vinyl type polymerizable group-containing silane, silane having the group capable of radical reaction and tri- or further poly-functional silane are subjected to polymerization generally in such amounts that the organosiloxane and/or bifunctional silane (the ratio, by weight, between the organosiloxane and bifunctional silane generally being 100/0 to 0/100, preferably 100/0 to 70/30) amounts to 50 to 99.9%, preferably 60 to 99.5%, the vinyl type polymerizable group-containing silane or silane having the group capable of radical reaction to 0 to 40%, preferably 0.5 to 30%, and the tri- or further poly-functional silane to 0 to 50%, preferably 0 to 39%. Either of the vinyl type polymerizable group-containing silane or silane having the group capable of radical reaction, and the tri- or further poly-functional silane do not amount to 0% at the same time but any of them is preferably used in an amount of not less than 0.1%.

When the proportions of the organosiloxane and bifunctional silane are excessively small, the resulting resin composition tends to become brittle. When they are too large, the flame retardancy and impact resistance may hardly be manifested and the final moldings tend to have a defective appearance. When the proportions of either of the vinyl type polymerizable group-containing silane or the silane having the group capable of radical reaction, and the tri- or further poly-functional silane are excessively small, the flame retardancy and impact resistance manifesting effects may be insignificant and/or the resulting moldings may have a defective appearance and, when they are excessive, the resulting resin composition tends to become brittle.

The tri- or further poly-functional silane mentioned above increases the toluene insoluble matter content mentioned above in many instances and, therefore, it is desirable, from the viewpoint of the flame retardancy and impact resistance, not to use such a tri- or further poly-functional silane but to use the above-mentioned vinyl type polymerizable group-containing silane or silane having the group capable of radical reaction alone together with the above-mentioned organosiloxane and/or bifunctional silane.

The polyorganosiloxane particles (B-1) mentioned above are preferably produced, for example, by emulsion-polymerizing a polyorganosiloxane-forming composition comprising the above-mentioned organosiloxane, bifunctional silane, and vinyl type polymerizable group-containing silane or silane having the group capable of radical reaction, optionally together with the tri- or further poly-functional silane, among others.

The emulsion-polymerization can be carried out, for example, by emulsifying and dispersing the polyorganosiloxane-forming composition in water by mechanical shearing in the presence of an emulsifier and placing the composition in an acidic condition. When, in that case, emulsion droplets not smaller than several micrometers in size are prepared by mechanical shearing, the volume average particle diameter of the polyorganosiloxane particles (B-1) obtained after polymerization can be controlled within the range of 0.02 to 0.6 μm by selecting the amount of the emulsifier employed, the diameter of the emulsion droplets mentioned above, and the inorganic or organic acid, which is to be mentioned later herein, and the amount thereof, among others.

To produce the polyorganosiloxane particles with a narrow particle diameter distribution, the method which comprises using, as seed particles, a vinyl (co)polymer prepared by (co)polymerizing the same vinyl monomer (e.g. styrene, butyl acrylate, methyl methacrylate) as used in the step of graft polymerization, which is to be mentioned later herein, in the conventional manner of emulsion polymerization, and subjecting an emulsion comprising emulsion droplets not smaller than several micrometers in size as obtained, for example, by emulsification by mechanical shearing of the above-mentioned polyorganosiloxane-forming composition, water and an emulsifier to emulsion polymerization in the presence of the seed particles in an acidic condition may be used. The volume average particle diameter of the thus-obtainable polyorganosiloxane particles can be controlled within the range of 0.01 to 0.5 μm, and the variation coefficient in particle diameter distribution within the range of 10 to 60%, in the same manner as mentioned above.

The above-mentioned emulsion droplets not smaller than several micrometers in size can be prepared by using a high-speed stirrer, such as a homomixer.

The emulsion polymerization of the polyorganosiloxane-forming composition may be carried out in one stage or stepwise in two or more stages.

In the above emulsion polymerization, an emulsifier capable of retaining its emulsifying ability in an acidic condition is used. Specific examples are alkylbenzenesulfonic acids, sodium alkylbenzenesulfonates, alkylsulfonic acids, sodium alkylsulfonates, sodium(di)alkyl sulfosuccinates, sodium polyoxyethylene nonylphenyl ethersulfonates, sodium alkyl sulfates, and the like. The emulsifiers may be used singly or two or more of them may be used in combination. Among these, alkylbenzenesulfonic acids, sodium alkylbenzenesulfonates, alkylsulfonic acids, sodium alkylsulfonates, and sodium(di)alkyl sulfosuccinates are preferred because of the relatively high emulsion stability they can provide. Further, alkylbenzenesulfonic acids and alkylsulfonic acids are particularly preferred since they can also serve as polymerization catalysts for the polyorganosiloxane-forming composition.

The acidic condition can be attained by addition of an inorganic acid, such as sulfuric acid or hydrochloric acid, or an organic acid, such as an alkylbenzenesulfonic acid, an alkylsulfonic acid or trifluoroacetic acid, to the system, and the pH is preferably adjusted to 1 to 3, more preferably to 1.0 to 2.5, so that the production facilities may not be corroded and an appropriate rate of polymerization may be obtained.

The heating for polymerization is carried out preferably to 60 to 120° C., more preferably 70 to 100° C., so that an adequate rate of polymerization may be attained.

In an acidic condition, the Si—O—Si bonds forming the polyorganosiloxane main chain are in equilibrium between cleavage and formation and this equilibrium is temperature-dependent, hence it is preffered to neutralize with an aqueous solution of an alkali, such as sodium hydroxide, potassium hydroxide or sodium carbonate, to stabilize the polyorganosiloxane chain. Furthermore, as the temperature lowers, that equilibrium shifts to siloxane bond formation side, favoring the formation of molecules higher in molecular weight or degree of crosslinking. Therefore, for attaining a high molecular weight or a high degree of crosslinking, it is preferable that the polymerization of the polyorganosiloxane-forming composition be carried out at 60° C. or higher and the reaction mixture be then cooled to room temperature or below and, after about 5 to 100 hours of standing, neutralized.

The thus-obtained polyorganosiloxane particles (B-1), when formed by polymerization, for example, of an organosiloxane or bifunctional silane, further with a vinyl type polymerizable group-containing silane or silane having the group capable of radical reaction added thereto, generally occur as a polymer having vinyl type polymerizable groups or groups capable of radical reaction resulting from random copolymerization. In cases where a tri- or further polyfunctional silane is used for copolymerization, they occur as a crosslinked polymer having a network structure. When crosslinking between vinyl type polymerizable groups is caused to occur with a radical polymerization initiator such as the one to be used in graft polymerization, which is to be mentioned later herein, they have a crosslinked structure resulting from chemical bonding between vinyl type polymerizable groups, with a part of the vinyl type polymerizable groups remaining unreacted.

The polyorganosiloxane-containing graft copolymer (B) is obtained by graft-polymerizing, in at least one stage, a monomer (B-3) comprising a polyfunctional monomer (B-2) containing at least two polymerizable unsaturated bonds within the molecule, and/or a vinyl monomer (B-4) in the presence of the polyorganosiloxane particles (B-1) obtained in the process mentioned above. In the above-mentioned graft polymerization, the so-called free polymer, namely a polymer resulting from polymerization of the graft component to form the graft copolymer (here, a (co)polymer of the monomer (B-3) comprising the polyfunctional monomer (B-2), and/or the vinyl monomer (B-4)), without grafting onto the stem component (here, the polyorganosiloxane particles (B-1)), giving a mixture of the graft copolymer and free polymer. In the present specification, both of the polymers are collectively referred to as "graft copolymer".

The polyfunctional monomer (B-2) containing at least two polymerizable unsaturated bonds within the molecule, which is to be used for the production of such graft copolymer (B), is a component serving to prevent the acetone insoluble matter content of the graft copolymer (B) from decreasing and improve the flame retardancy. The polyfunctional monomer (B-2) may also be used in the form of the monomer (B-3) in admixture with another copolymerizable monomer (B-5). In that case, the proportion of the polyfunctional monomer (B-2) in the monomer (B-3) is preferably 100 to 20% by weight, more preferably 100 to 50% by weight (correspondingly, the proportion of the copolymerizable monomer (B-5) in the monomer (B-3) being preferably 0 to 80% by weight, more preferably 0 to 50% by weight). When the proportion of the polyfunctional monomer (B-2) in the monomer (B-3) is too small, no satisfactory flame retardancy will be obtained.

As specific examples of the polyfunctional monomer (B-2), there may be mentioned allyl methacrylate, allyl acrylate, triallyl cyanurate, triallyl isocyanurate, diallyl phthalate, ethylene glycol dimethacrylate, 1,3-butylene glycol dimethacrylate, and divinylbenzene, among others. The polyfunctional monomer (B-2) may comprise one single species or a combination of two or more species. Among these, ally methacrylate, in particular, is preferably used due to the advantages in economy and effect. As examples of the other copolymerizable monomer (B-5), there may be mentioned the same species as those which are to be given below as examples of the vinyl monomer (B-4). The copolymerizable monomer (B-5) may comprise one single species or two or more species.

The vinyl monomer (B-4) used in the production of the graft copolymer (B) is a component leading good dispersion of the graft copolymer (B) in the thermoplastic resin (A), which is to be described in detail later herein, in the step of kneading therewith and thereby cause impact resistance manifestation.

As the vinyl monomer (B-4), there may be mentioned, for example, aromatic vinyl monomers such as styrene, α-methylstyrene, p-methylstyrene and p-butylstyrene, cyanovinyl monomers such as acrylonitrile and methacrylonitrile, (meth)acrylic ester monomers such as methyl acrylate, ethyl acrylate, propyl acrylate, butyl acrylate, 2-ethylhexyl acrylate, glycidyl acrylate, hydroxyethyl acrylate, hydroxybutyl acrylate, methyl methacrylate, ethyl methacrylate, butyl methacrylate, lauryl methacrylate, glycidyl methacrylate and hydroxyethyl methacrylate, and carboxyl group-containing vinyl monomers such as itaconic acid, (meth)acrylic acid, fumaric acid and maleic acid. The vinyl monomer (B-4) may comprise one single species or a combination of two or more species. A mixture of an aromatic vinyl monomer such as styrene and a cyanovinyl monomer such as acrylonitrile, methyl methacrylate, and a mixture of methyl methacrylate as the main component with methyl acrylate, acrylonitrile or the like are preferred among others since they can lead to impact resistance manifestation in small amounts.

The vinyl monomer (B-4) is one such that the polymer derived from the vinyl monomer (B-4) alone preferably has a solubility parameter of not less than 9.15 $(cal/cm^3)^{1/2}$, more preferably not less than 9.17 $(cal/cm^3)^{1/2}$, still more preferably not less than 9.20 $(cal/cm^3)^{1/2}$, but not more than 10.15 $(cal/cm^3)^{1/2}$, more preferably not more than 10.10 $(cal/cm^3)^{1/2}$, still more preferably not more than 10.05 $(cal/cm^3)^{1/2}$. When the solubility parameter is outside the above range, both of the flame retardancy and impact resistance tend to deteriorate.

The solubility parameter is a value calculated by the group contribution method described in "Polymer Handbook", published in 1999 by John Wiley & Sons, Ltd., 4th edition, Section VII, pages 682–685, using Small's group parameters. For example, the value for poly(methyl methacrylate) (assumed repeating unit molecular weight 100 g/mol, assumed density 1.19 g/cm$^3$) is 9.25 $[(cal/cm^3)^{1/2}]$, for poly(butyl methacrylate) (assumed repeating unit molecular weight 142 g/mol, assumed density 1.06 g/cm$^3$) 9.47 $[(cal/cm^3)^{1/2}]$, for poly(methyl acrylate) (assumed repeating unit molecular weight 86 g/mol, assumed density 1.19 g/cm$^3$) 9.47 $[(cal/cm^3)^{1/2}]$, for poly(butyl acrylate) (assumed repeating unit molecular weight 128 g/mol, assumed density 1.06 g/cm$^3$) 8.97 $[(cal/cm^3)^{1/2}]$, for polystyrene (assumed repeating unit molecular weight 104, assumed density 1.05 g/cm$^3$) 9.03 $[(cal/cm^3)^{1/2}]$, and for polyacrylonitrile (assumed repeating unit molecular weight 53, assumed density 1.18 g/cm$^3$) 12.71 $[(cal/cm^3)^{1/2}]$. The density values of the polymers as used are the values described in Ullmann's Encyclopedia of Industrial Chemistry, published in 1992 by the publisher VCH, Vol. A21, page 169. As for the solubility parameter δc of a copolymer, the value for the main component is used when the weight fraction (of minor component) is less than 5% and, when that weight fraction is not less than 5%, it is supposed that weight fraction-based additivity holds good. Thus, the solubility parameter of a copolymer constituted of m vinyl monomer species can be calculated from the solubility parameter δn of the homopolymer of each individual constituent vinyl monomer and the weight fraction Wn thereof according to the equation (1):

$$\delta_c = \sum_{n=1}^{m} \delta_n W_n \qquad (1)$$

Thus, as for the solubility parameter of a copolymer composed of 75% of styrene and 25% of acrylonitrile, for instance, a value of 9.95 $[(cal/cm^3)^{1/2}]$ is obtained by making a calculation according to the equation (1) using the solubility parameter values 9.03 $[(cal/cm^3)^{1/2}]$ for polystyrene and 12.71 $[(cal/cm^3)^{1/2}]$ for polyacrylonitrile.

When different vinyl monomers or different vinyl monomer compositions are polymerized in two or more stages, the solubility parameter δs of the vinyl polymer components in the graft copolymer obtained is calculated supposing that additivity holds good using the weight fractions, namely the values obtained by dividing the weight of the vinyl polymer components obtained in the respective stages by the total weight of the finally obtained vinyl polymer components. Thus, when the polymerization is carried out in q stages, δs can be calculated from the solubility parameter δi of the polymer obtained in the stage i and the corresponding weight fraction Wi in accordance with the equation (2):

$$\delta_s = \sum_{i=1}^{q} \delta_i W_i \qquad (2)$$

For example, when the polymerization is carried out in two stages and 50 parts by weight of a copolymer composed of 75% of styrene and 25% of acrylonitrile is obtained in the first stage and 50 parts by weight of a methyl methacrylate polymer is obtained in the second stage, the solubility parameter of the polymer obtained in this two-stage polymerization is calculated according to the equation (2) using the solubility parameter values 9.95 $[(cal/cm^3)^{1/2}]$ for the copolymer of 75% styrene and 25% acrylonitrile and 9.25 $[(cal/cm^3)^{1/2}]$ for poly(methyl methacrylate). A value of 9.60 $[(cal/cm^3)^{1/2}]$ is thus obtained.

In such graft copolymer (B), the polyorganosiloxane particles (B-1) preferably accounts for not less than 40 parts by weight (more preferably not less than 63 parts by weight) but not more than 95 parts by weight (more preferably not more than 85 parts by weight), the monomer (B-3) comprising the polyfunctional monomer (B-2) and another copolymerizable monomer (B-5) preferably accounts for 0 to 10 parts by weight (more preferably 0 to 7 parts by weight), and the vinyl monomer (B-4) preferably accounts for not less than 5 parts by weight (more preferably not less than 7 parts by weight) but not more than 50 parts by weight (more preferably not more than 30 parts by weight), per 100 parts by weight of the whole graft copolymer. When the proportion of the polyorganosiloxane particles (B-1) is higher (accordingly, that of the vinyl monomer (B-4) is lower), the graft copolymer (B) will not be satisfactorily dispersed in the thermoplastic resin (A), often leading to decreases in impact resistance. Conversely, when that proportion is too small (accordingly, that of the monomer (B-3) and/or vinyl monomer (B-4) is excessive), the flame retandancy tends to deteriorate. When the proportion of the monomer (B-3) is excessive, the impact resistance of the moldings finally obtained tends to decrease.

The graft copolymer (B) preferably has an acetone insoluble matter content (the weight percent of the acetone insoluble matter after 48 hours of immersion of 1 g of the graft copolymer in 80 ml of acetone at room temperature) of not lower than 80% by weight, more preferably not lower than 85% by weight, still more preferably not lower than 90% by weight, since good flame retardancy is achieved in such cases. For obtaining such graft copolymer (B), it is necessary to select an appropriate vinyl type polymerizable group-containing silane or silane having the group capable of radical reaction, or use a sufficient amount of the polyfunctional monomer (B-2).

The vinyl type polymerizable group-containing silane can be appropriately selected, for example, from among (meth) acryloyloxy group-containing silanes such as γ-methacryloyloxypropyldimethoxymethylsilane, γ-methacryloyloxypropyltrimethoxysilane, γ-methacryloyloxypropyltriethoxysilane, γ-methacryloyloxypropyldiethoxymethylsilane, γ-acryloyloxypropyldimethoxymethylsilane and γ-acryloyloxypropyltrimethoxysilane. In this case, the graft copolymer (B) can have an acetone insoluble matter content of not less than 80%, without using the polyfunctional monomer (B-2).

When a vinylphenyl group-containing silane such as p-vinylphenyldimethoxymethylsilane or p-vinylphenyltrimethoxysilane, a vinyl group-containing silane such as vinylmethyldimethoxysilane, vinyltrimethoxysilane or vinyltriethoxysilane, or a mercapto group-containing silane such as mercaptopropyltrimethoxysilane or mercaptopropyldimethoxymethylsilane is selected as the vinyl type polymerizable group-containing silane or silane having the group capable of radical reaction, the monomer (B-3) comprising the polyfunctional monomer (B-2) and another copolymerizable monomer (B-5) is preferably used in an amount of 1.5 to 8 parts by weight, more preferably 2.5 to 7 parts by weight, per 100 parts by weight of the whole graft copolymer (B). When the amount of the monomer (B-3) is too small, the acetone insoluble matter content will become lower than 80% and the flame retardancy will deteriorate. When the monomer (B-3) is excessive, the impact resistance of the moldings finally obtained may become decreased in some instances.

In obtaining the graft copolymer (B) according to the invention, the conventional seed emulsion polymerization technique can be applied. As a simple and convenient method, there may be mentioned the method which comprises radical (graft) polymerizing, in at least one stage, the monomer (B-3) and/or vinyl monomer (B-4) in the presence of the polyorganosiloxane particles (B-1) occurring in a latex form. This radical polymerization may be carried out without any particular restriction, for example by the method comprising thermally decomposing a radical polymerization initiator or by the method in a redox system using a reducing agent.

As specific examples of the radical polymerization initiator, there may be mentioned organic peroxides such as cumene hydroperoxide, tert-butyl hydroperoxide, benzoyl peroxide, tert-butyl peroxyisopropyl carbonate, di-tert-butyl peroxide, tert-butyl peroxylaurate, lauroyl peroxide, succinic acid peroxide, cyclohexanone peroxide and acetylacetone peroxide, inorganic peroxides such as potassium persulfate and ammonium persulfate, and azo compounds such as 2,2'-azobisisobutyronitrile. Among these, organic peroxides and inorganic peroxides are particularly preferred because easy to handle them in emulsion polymerization.

As the reducing agent used in the redox system, there may be mentioned such mixtures as ferrous sulfate/glucose/sodium pyrophosphate, ferrous sulfate/dextrose/sodium pyrophosphate, and ferrous sulfate/sodium formaldehyde sulfoxylate/salt of ethylenediamineacetic acid.

The radical polymerization initiator is used generally in an amount of 0.005 to 20 parts by weight, preferably 0.01 to 10 parts by weight, most preferably 0.04 to 5 parts by weight, per 100 parts by weight of the sum of the monomer (B-3) and/or vinyl monomer (B-4) employed, or per 100 parts by weight of the monomer(s) used in each stage in the case of multistage polymerization. When the polymerization is carried out in a plurality of stages, the radical polymerization initiators and the amounts thereof in the respective stages may be the same or different. When the amount of the radical polymerization initiator is smaller, the rate of reaction will be low, resulting in a tendency toward poor productivity. When it is excessive, the heat generated during reaction tends to become much, making it difficult to control the production process.

Where necessary, a chain transfer agent may be used on the occasion of radical polymerization. The chain transfer agent is not particularly restricted but may be any of those conventionally used in emulsion polymerization. As examples, there may be mentioned tert-dodecylmercaptan, n-octylmercaptan, n-tetradecylmercaptan, n-hexylmercaptan and the like.

While it is an optional component, the chain transfer agent, when used, is used preferably in an amount of 0.01 to 5 parts by weight per 100 parts by weight of the sum of the monomer (B-3) and/or vinyl monomer (B-4) employed, or per 100 parts by weight of the monomer(s) used in each stage in the case of multistage polymerization. When the polymerization is carried out in a plurality of stages, the chain transfer agents and the amounts thereof in the respective stages may be the same or different. When the amount of the chain transfer agent is less than 0.01 part by weight, the effect of the use thereof will not be obtained. When it exceeds 5 parts by weight, the rate of reaction tends to become slow, resulting in reduced productivity.

Generally, the reaction temperature during polymerization is preferably 30 to 120° C. for the ease of control.

In the above polymerization, when the polyorganosiloxane particles (B-1) are vinyl type polymerizable group- or ones having the group capable of radical reaction, they serve as grafting reaction sites, and grafts are formed on the occasion of radical polymerization of the monomer (B-3) and/or vinyl monomer (B-4). When there are no vinyl type polymerizable groups or groups capable of radical reaction on the polyorganosiloxane particles (B-1), the use of a specific radical initiator, for example tert-butyl peroxylaurate, results in hydrogen abstraction from an organic group (e.g. methyl group) bound to the silicon atom, and the thus-formed radicals induce polymerization of the monomer (B-3) and/or vinyl monomer (B-4) to form grafts. In cases where the monomer (B-3) is subjected to graft polymerization and then, further, the vinyl monomer (B-4) is subjected to graft polymerization, the vinyl monomer (B-4), when polymerized by means of a radical polymerization initiator, reacts not only with the polyorganosiloxane particles (B-1), like the monomer (B-3), but also with unsaturated bonds in the polymer formed by the polyfunctional monomer (B-2) in the monomer (B-3) to give grafts made of the vinyl monomer (B-4).

When the graft copolymer (B) occurs in a latex form, the particle diameter thereof is preferably not smaller than 0.01 µm, more preferably not smaller than 0.03 µm, still more preferably not smaller than 0.10 µm, but preferably not larger than 0.7 µm, more preferably not larger than 0.5 µm, still more preferably not larger than 0.35 µm. Excessively small or large particle diameters tend to cause decreases in impact resistance.

When the graft copolymer (B) is in a latex form, the variation coefficient in particle diameter distribution is preferably not higher than 100%, more preferably not higher than 60%, still more preferably not higher than 40%. When the variation coefficient is excessively high, the flame retardancy may deteriorate in some instances. The lower limit to the coefficient of variation is not restricted, and a smaller value is more preferred. It is difficult, however, to attain a value of not higher than 5%.

The graft copolymer (B) obtained by emulsion polymerization can be recovered in the conventional manner, for example by the method (coagulation method) comprising adding an inorganic bivalent or further polyvalent metal salt, such as calcium chloride, magnesium chloride, magnesium sulfate or aluminum chloride, to the latex to cause coagulation of the latex, and separating, washing with water, dehydrating and drying the coagulum. The method of coagulation is not particularly restricted but various coagulation methods can be employed. Preferred from the viewpoint of flame retardancy, impact resistance and anti-blocking property, however, is the above-mentioned method of adding an inorganic bivalent or further polyvalent metal salt. Preferred, in particular, as the inorganic bivalent or further polyvalent metal salt are inorganic alkaline earth metal salts, typically calcium chloride, magnesium chloride and magnesium sulfate, because of their being available economically at low prices and, further, in view of the fact that they are safe in handling and rather friendly to the environment. By application of such inorganic bivalent or further polyvalent metal salt, the emulsifier used in the step of emulsion polymerization is almost quantitatively converted to the corresponding bivalent or further polyvalent metal salt thereof, and the metal salt is contained in the graft copolymer (B). The emulsifier-derived bivalent or further polyvalent metal salt thus formed is effective as an ingredient capable of improving the powder characteristics, in particular the anti-blocking property, of the graft copolymer (B) according to the invention.

In the practice of the invention, the spray drying method can be used as well. The recovery of the graft copolymer (B) as powder by the spray drying method may be carried out while adding a bivalent or further polyvalent metal salt of a sulfur-containing organic compound. As for the method of addition, the above-mentioned bivalent or further polyvalent metal salt may be added either in the form of a powder as it is or in the form of an aqueous dispersion. In the case of addition in the form of an aqueous dispersion, drying is further continued to remove moisture finally to a substantial extent. The term "substantial extent" as used herein means that the weight fraction of the moisture contained in the mixture of the graft copolymer (B) recovered and the metal salt of the sulfur-containing organic compound is not more than 5% by weight, preferably not more than 2% by weight. Preferably, the bivalent or further polyvalent metal salt of the sulfur-containing organic compound is not added to the latex but is added to sprayed particles during drying or to the powder obtained. When added to the latex, it may clog a nozzle or cause the same kind of trouble, making spray drying impossible in some cases.

When the bivalent or further polyvalent metal salt of the sulfur-containing organic compound is added in the form of a powder in the step of spray drying, such fine mixing as realizable by the coagulation method cannot be attained, hence the effect improving anti-blocking property may be inferior as compared with the coagulation method in certain instances. Even when the bivalent or further polyvalent metal salt of the sulfur-containing organic compound is added in the form of an aqueous dispersion in the spray drying process, the bivalent or further polyvalent metal salt of the sulfur-containing organic compound is added in the form of a slurry in some instances since it is low in solubility in water and, on such occasions, the effect improving anti-blocking property may sometimes be poor as compared with the coagulation method.

The metal salt (C) to be used according to the invention may be at least one species selected from the group consisting of alkali metal salts and bivalent or further polyvalent metal salts. From the viewpoint of flame retardancy, impact resistance and, further, anti-blocking property, alkali metal salts of sulfur-containing organic compounds and/or bivalent or further polyvalent metal salts of sulfur-containing organic compounds are preferred. In a particularly preferred mode of the flame-retardant thermoplastic resin composition of the invention, the composition contains both an alkali metal salt of a sulfur-containing organic compound and a bivalent or further polyvalent metal salt of a sulfur-containing organic compound.

When used in combination with the polyorganosiloxane-containing graft copolymer (B), the alkali metal salt of the sulfur-containing organic compound, which can be used in the practice of the invention, can synergistically enhance the flame retardancy. The above-mentioned alkali metal salt may comprise one single species or a combination of two or more species.

The sulfur-containing organic compound mentioned above is preferably a sulfonic acid, a sulfonamide, or a sulfuric ester. More preferably, a sulfonic acid is selected, among others, from the viewpoint of flame retardancy and, most preferably, an (alkyl)aromatic sulfonic acid, a perfluoroalkanesulfonic acid, an aliphatic sulfonic acid or a diphenyl sulfone sulfonic acid is selected. The alkali metal salt-forming metal includes sodium, potassium, lithium, rubidium, cesium, and so forth. Preferred are sodium and potassium.

Preferably selected as the (alkyl)aromatic sulfonic acid are dodecylbenzenesulfonic acid, p-toluenesulfonic acid, dichlorobenzenesulfonic acid, benzenesulfonic acid, naphthalenesulfonic acid, and the like. These are most preferably used in the potassium or sodium salt form, among others.

Preferably selected as the perfluoroalkanesulfonic acid are sulfonic acids having a perfluoroalkane group preferably containing 1 to 19 carbon atoms, more preferably 4 to 8 carbon atoms, more preferably perfluorobutanesulfonic acid, perfluoromethylbutanenesulfonic acid, perfluorooctanesulfonic acid, and the like. These are most preferably used in the sodium or potassium salt form, among others.

Preferably selected as the aliphatic sulfonic acid are, for example, alkylsulfonic acids such as dodecylsulfonic acid, dialkyl sulfosuccinates such as dioctyl sulfosuccinate and didodecyl sulfosuccinate, and the like. These are preferably used in the potassium or sodium salt form, among others.

Preferably selected as the diphenyl sulfone sulfonic acid are, for example, diphenyl sulfone-3-sulfonic acid, 4,4'-dibromodiphenyl sulfone-3-sulfonic acid, 4-chloro-4'-nitrodiphenyl sulfone-3-sulfonic acid, diphenyl sulfone-3,3'-disulfonic acid, and the like. These are preferably used in the (di)sodium or (di)potassium salt form, among others.

Preferably selected as the sulfonamide are, for example, saccharin, N-(p-tolylsulfonyl)-p-toluenesulfimide, N-(N'-benzylaminocarbonyl)sulfanilimide, N-(phenylcarboxyl)sulfanilimide, and the like. These are preferably used in the potassium or sodium salt form, among others.

Preferably selected as the sulfuric ester are alkyl sulfuric acid monoesters, typically dodecyl sulfuric acid monoester, and the like. These are preferably used in the potassium or sodium salt form, among others.

Among those mentioned above, potassium salt of diphenyl sulfone-3-sulfonic acid, potassium salt of perfluorobutanesulfonic acid, sodium salt of dodecylbenzenesulfonic acid, and potassium salt of dodecylbenzenesulfonic acid are particularly preferably used since they are quite chlorine-free and bromine-free and can manifest flame retardancy at low addition levels. Most preferred are (alkyl)aromatic sulfonic acids, typically dodecylbenzenesulfonic acid, in the sodium salt form because of their commercial availability at low prices.

The bivalent or further polyvalent metal salt of the sulfur-containing organic compounds, which can be used in the practice of the invention, can improve the powder characteristics, in particular the anti-blocking property, of the graft copolymer (B) of the invention in the step of recovery thereof, without impairing the thermal stability of the resulting flame-retardant thermoplastic resin compositions. These may be used singly, or two or more of them may be used in combination. The sulfur-containing organic compound to be used here may be the same as or different from the above-mentioned sulfur-containing organic compound used in the form of an alkali metal salt. The addition of metal salts of other compounds than the sulfur-containing organic compounds causes coloration of the moldings or otherwise impair the thermal stability of the thermoplastic resin compositions obtained and, in certain instances, cause deterioration of the thermoplastic resins so as to make the step of molding itself impossible, hence are not preferred. On the other hand, with the sulfur-containing organic compound in a univalent metal salt form alone, it is difficult to give the effect improving anti-blocking property to a satisfactory extent. Preferably, a sulfur-containing organic compound is selected from among such ones as mentioned hereinabove referring to the alkali metal salt of the sulfur-containing organic compound and is used in the form of an alkaline earth metal salt, for example calcium salt or magnesium salt.

The metal salt (C) is used in an amount of not less than 0.0005 part by weight (preferably not less than 0.001 part by weight, more preferably not less than 0.004 part by weight) but not more than 5 parts by weight (preferably not more than 0.8 part by weight, still more preferably not more than 0.2 part by weight), per 100 parts by weight of the thermoplastic resin (A). When the level of addition of the metal salt (C) is lower, no effect will be produced and, when it is excessive, molding faults, such as tanning of resin, may occur in the step of molding.

The flame-retardant thermoplastic resin composition of the invention, when it further contains an antioxidant (E), can show enhanced flame retardancy. The level of addition is preferably not more than 2 parts by weight, more preferably not more than 0.8 part by weight, still more preferably not more than 0.7 part by weight, per 100 parts by weight of the thermoplastic resin (A). At levels exceeding 2 parts by weight, the impact resistance tends to decrease. The lower limit is preferably 0.05 part by weight. Although the mechanisms by the antioxidant are not known in the case of the invention, the antioxidant is supposed to contribute to the prevention of degradation of the thermoplastic resin or of the graft component of the polyorganosiloxane-containing graft copolymer (B) on molding. The antioxidant (E) may comprise one single species or a combination of two or more species.

The combined use, as the antioxidant (E), of at least one antioxidant having the isocyanuric ring structure within the molecule and at least one other antioxidant is particularly effective. The proportion of the at least one antioxidant having the isocyanuric ring structure within the molecule in the total antioxidant is preferably not less than 10% by weight, more preferably not less than 20% by weight, but preferably not more than 90% by weight, still more preferably not more than 80% by weight. In higher or lower proportions, the effect improving flame retardancy will be barely obtained and, in some instances, a detrimental effect may be produced. The antioxidant having the isocyanuric ring structure within the molecule is, for example, tris(3,5-di-tert-butyl-4-hydroxybenzyl) isocyanurate. As other antioxidants, there may be mentioned, for example, 1,1,3-tris(2-methyl-4-hydroxy-5-tert-butylphenyl)butane, dilauryl thiodipropionate, distearyl thiodipropionate, dimyristyl thiodipropionate, and like dialkyl thiodipropionates.

The thermoplastic resin (A) used in the practice of the invention is not particularly restricted but, from the viewpoint of impact resistance, it preferably comprises at least one thermoplastic resin selected form the group consisting of acrylonitrile-styrene copolymers, acrylonitrile-butadiene rubber-styrene copolymers (ABS resins), acrylonitrile-butadiene rubber-a-methylstyrene copolymers, styrene-butadiene rubber-acrylonitrile-N-phenylmaleimide copolymers, acrylonitrile-acrylic rubber-styrene copolymers (AAS resins), acrylonitrile-acrylic rubber-a-methylstyrene copolymers, styrene-acrylic rubber-acrylonitrile-N-phenylmaleimide copolymers, acrylonitrile-acrylic/silicone composite rubber-styrene copolymers, acrylonitrile-acrylic/silicone composite rubber-a-methylstyrene copolymers, styrene-acrylic/silicone composite rubber-acrylonitrile-N-phenylmaleimide copolymers, acrylonitrile-ethylene/propylene rubber-styrene copolymers (AES resins), polycarbonates, polyesters, polyphenylene ether, polystyrene, poly(methyl methacrylate), methyl methacrylate-styrene copolymers and polyamides, in particular.

In the practice of the invention, the thermoplastic resin (A) is preferably a polycarbonate-based resin. The polycarbonate-based resin preferably comprises not less than 70% by weight, more preferably not less than 85% by weight, of a polycarbonate resin. Most preferably, it substantially comprises a polycarbonate resin alone. By saying "substantially comprises a polycarbonate resin alone" herein, it is meant that the polycarbonate resin accounts for at least 95% by weight. When the polycarbonate resin proportion is within the above range, both good flame retardancy and high impact resistance can be obtained at the same time. Such effects become better as the polycarbonate resin proportion increases and, with substantially the polycarbonate resin alone, the effects become maximal. As the component other than the polycarbonate resin in the polycarbonate-based resin, there may be mentioned, among others, those thermoplastic resins mentioned above. The polycarbonate resin may comprise one single species or a combination of two or more species.

The polycarbonate resin is not particularly restricted but includes various species. Generally, aromatic polycarbonates produced by the reaction of a dihydric phenol and a carbonate precursor can be used. Thus, use can be made of those produced by reacting a dihydric phenol with a carbonate precursor by the solution method or fusion method, namely by reacting the dihydric phenol with phosgene or by reacting the dihydric phenol with diphenyl carbonate in the manner of transesterification.

The dihydric phenol includes various species, in particular 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis(4-hydroxyphenyl) oxide, bis(4-hydroxyphenyl) sulfide, bis(4-hydroxyphenyl) sulfone, bis(4-hydroxyphenyl) sulfoxide, bis(4-hydroxyphenyl) ether, bis(4-hydroxyphenyl) ketone, and the like.

Most preferred dihydric phenols are bis(hydroxyphenyl) alkane type ones, in particular ones comprising bisphenol A as the main material. The carbonate precursor includes carbonyl halides, carbonyl esters, and haloformates, among others, and, more specifically, there may be mentioned phosgene, dihydric phenol dihaloformates, diphenyl carbonate, dimethyl carbonate, diethyl carbonate, and the like.

In addition, the dihydric phenol further includes hydroquinone, resorcinol, catechol and the like. The dihydric phenols may be used singly or two or more of them may be used in admixture.

The polycarbonate resin may have a branched structure, and the branching agent includes 1,1,1-tris(4-hydroxyphenyl)ethane, α,α',α"-tris(4-hydroxyphenyl)-1,3,5-triisopropylbenzene, phloroglucinol, trimellitic acid, isatinbis(o-cresol) and the like. Phenol, p-tert-butylphenol, p-tert-octylphenol, p-cumylphenol or the like is used for the adjustment of molecular weight.

Such copolymers as polyester-polycarbonate resins or mixtures of various polycarbonate-based resins may also be used as the polycarbonate-based resin. When such a copolymer as mentioned above is used, an adjustment is made for the carbonate unit proportion in the polymer to fall within the range mentioned above.

The lower limit to the viscosity average molecular weight of the polycarbonate-based resin is preferably not lower than 13,000, more preferably not lower than 15,000. The upper limit is preferably not higher than 25,000, more preferably not higher than 22,000, still more preferably not higher than 20,000. When the viscosity average molecular weight is too low, the impact resistance tends to decrease and, when the viscosity average molecular weight is excessively high, the moldability tends to become worse. The viscosity average molecular weight (Mv) is the value determining by measuring the viscosity of a methylene chloride solution at 20° C. using an Ubbelohde's viscometer, determining the limiting viscosity [η], and making a calculation according to the equation: $[\eta]=1.23\times10^{-5} Mv^{0.83}$. Two or more polycarbonate resins differing in molecular weight may be used as a blend.

In the flame-retardant thermoplastic resin composition of the invention, there may be further incorporated a fluororesin (D). The fluororesin prevents the resin melted in combustion testing, such as the test according to UL-94, from falling dropwise (or dripping). As specific examples which are preferred in view of their high dripping preventive effect, there may be mentioned polymonofluoroethylene, polydifluoroethylene, polytrifluoroethylene, polytetrafluoroethylene, tetrafluoroethylene/hexafluoroethylene copolymers and other fluorinated polyolefin resins as well as poly(vinylidene fluoride) resins. The fluororesin (D) may comprise one single species or a combination of two or more species.

The fluororesin (D) is used in an amount of not more than 2 parts by weight, preferably not more than 1 part by weight, more preferably not more than 0.6 part by weight, per 100 parts by weight of the thermoplastic resin (A). While the dripping preventive effect increases as the amount of the fluororesin increases, an excessively large amount thereof unfavorably results in a cost increase, with the dripping preventive effect reaching a point of saturation. The fluororesin (D) is used in an amount of not less than 0.05 part by weight, preferably not less than 0.1 part by weight, more preferably not less than 0.2 part by weight.

In the flame-retardant thermoplastic resin composition of the invention, there may further be incorporated one or more of pigments, fillers, impact modifiers, antioxidants other than the antioxidant (E), ultraviolet absorbers, glass fibers, lubricants, polymeric lubricants, and so forth.

The flame-retardant thermoplastic resin composition of the invention can be produced by blending the respective components/ingredients together and melt-kneading the mixture. When the polyorganosiloxane-containing graft copolymer (B) contains metal salt (C), it is not necessary to separately add a metal salt (C). However, a metal salt (C) may be added separately.

The flame-retardant thermoplastic resin composition of the invention, when it contains both an alkali metal salt of a sulfur-containing organic compound and a bivalent or further polyvalent metal salt of a sulfur-containing organic compound as the metal salt (C), is preferably produced by emulsion-polymerizing, in at least one stage, the monomer (B-3) comprising the polyfunctional monomer (B-2) containing at least two polymerizable unsaturated bonds within the molecule, and/or the vinyl monomer (B-4) in the presence of the polyorganosiloxane particles (B-1), then recovering, by the coagulation method using an inorganic salt of a bivalent or further polyvalent metal, the resulting polyorganosiloxane-containing graft copolymer containing the bivalent or further polyvalent metal salt of the emulsifier-derived sulfur-containing organic compound, and mixing up, by melt kneading, the thermoplastic resin (A), the polyorganosiloxane-containing graft copolymer containing the bivalent or further polyvalent metal salt of the sulfur-containing organic compound, the alkali metal salt of the sulfur-containing organic compound, and the fluororesin (D) In the step of melt kneading, a bivalent or further polyvalent metal salt of a sulfur-containing organic compound may be added separately.

It is also possible to produce the composition of the invention by first emulsion-polymerizing, in at least one stage, the monomer (B-3) comprising the polyfunctional monomer (B-2) containing at least two polymerizable unsaturated bonds within the molecule, and/or the vinyl monomer (B-4) in the presence of the polyorganosiloxane particles (B-1), then recovering, by the spray drying method, the resulting polyorganosiloxane-containing graft copolymer containing the alkali metal salt of the emulsifier-derived sulfur-containing organic compound, and mixing up, by melt kneading, the thermoplastic resin (A), the polyorganosiloxane-containing graft copolymer containing the alkali metal salt of the sulfur-containing organic compound, the bivalent or further polyvalent metal salt of the sulfur-containing organic compound, and the fluororesin (D). In the step of melt kneading, an alkali metal salt of a sulfur-containing organic compound may be added separately.

Further, it is possible to produce the composition of the invention by first emulsion-polymerizing, in at least one stage, the monomer (B-3) comprising the polyfunctional monomer (B-2) containing at least two polymerizable unsaturated bonds within the molecule, and/or the vinyl monomer (B-4) in the presence of the polyorganosiloxane particles (B-1), then recovering, by the spray drying method with adding a bivalent or further polyvalent metal salt of a sulfur-containing organic compound during spray drying, the resulting polyorganosiloxane-containing graft copolymer containing an alkali metal salt of the emulsifier-derived sulfur-containing organic compound and the bivalent or further polyvalent salt of the sulfur-containing organic compound, and mixing up, by melt kneading, the thermoplastic resin (A), the polyorganosiloxane-containing graft copolymer containing the alkali metal salt of the sulfur-containing organic compound and the bivalent or further polyvalent metal salt of the sulfur-containing organic compound, and the fluororesin (D) In the step of melt kneading, an alkali metal salt of a sulfur-containing organic compound and/or a bivalent or further polyvalent metal salt of a sulfur-containing organic compound may be added separately.

The thus-obtained flame-retardant thermoplastic resin composition is excellent in flame retardancy and impact resistance.

In the flame-retardant thermoplastic resin composition of the invention, there may be incorporated another flame retardant. As specific examples of the flame retardant to be used in combination which are preferred because of their being halogen-free and phosphorus-free, for instance, there may be mentioned organic silicone compounds and/or silica, in particular aromatic group-containing organic silicone compounds other than the polyorganosiloxane-containing graft copolymer. Further, there may be mentioned triazine compounds such as cyanuric acid and melamine cyanurate, and boron compounds such as boron oxide and zinc borate, among others. It is also possible to combinedly use a phosphorus compound such as triphenyl phosphate, condensed phosphoric acid ester, or stabilized red phosphorus. In this case, the employment of the flame-retardant thermoplastic resin composition of the invention in phosphorus-based flame retardant-containing compositions can advantageously reduce the phosphorus-based flame retardant level in those compositions.

The flame-retardant thermoplastic resin composition of the invention can be molded by any of the molding methods used in molding thermoplastic resin compositions in general, namely by the injection molding, extrusion molding, blow molding, calender molding or like molding method, for use in those fields in which flame retardancy and impact resistance are required, including, but not limited to, housings and chassis of various OA/information/household electric appliances such as desktop computers, notebook computers, tower computers, printers, copiers, facsimile telegraphs, cellular phones, PHS phones, televisions, and video recorders, parts or members of various building materials, and various automotive parts or members, among others. The moldings obtained are excellent in impact resistance and flame retardancy.

The flame retardant for thermoplastic resins as provided by the present invention comprises a polyorganosiloxane-containing graft copolymer obtained by polymerizing, in at least one stage, a monomer (B-3) comprising a polyfunctional monomer (B-2) containing at least two polymerizable unsaturated bonds within the molecule, and/or a vinyl monomer (B-4) in the presence of polyorganosiloxane particles (B-1), an alkali metal salt of a sulfur-containing organic compound, and a bivalent or further polyvalent metal salt of a sulfur-containing organic compound. The respective components are as described hereinabove. The flame retardant for thermoplastic resins as provided by the present invention is excellent in powder properties, in particular anti-blocking property, and therefore is easy to handle and, when incorporated in such thermoplastic resins as mentioned above, can give thermoplastic resin compositions excellent in flame retardancy and impact resistance.

The flame retardant for thermoplastic resins according to the invention can be produced by emulsion-polymerizing, in at least one stage, the monomer (B-3) comprising the polyfunctional monomer (B-2) containing at least two polymerizable unsaturated bonds within the molecule, and/or the vinyl monomer (B-4) in the presence of the polyorganosiloxane particles (B-1), then recovering, by the coagulation method using an inorganic salt of a bivalent or further polyvalent metal, the resulting polyorganosiloxane-containing graft copolymer containing the bivalent or further polyvalent metal salt of the emulsifier-derived sulfur-containing organic compound, and mixing up the polyorganosiloxane-containing graft copolymer containing the bivalent or further polyvalent metal salt of the sulfur-containing organic compound, and the alkali metal salt of the sulfur-containing organic compound. On the occasion of melt kneading, a bivalent or further polyvalent metal salt of a sulfur-containing organic compound may be added separately.

The flame retardant can also be produced by emulsion-polymerizing, in at least one stage, the monomer (B-3) comprising the polyfunctional monomer (B-2) containing at least two polymerizable unsaturated bonds within the molecule, and/or the vinyl monomer (B-4) in the presence of the polyorganosiloxane particles (B-1), then recovering, by the spray drying method, the resulting polyorganosiloxane-containing graft copolymer containing an alkali metal salt of the emulsifier-derived sulfur-containing organic compound, and mixing up the polyorganosiloxane-containing graft copolymer containing the alkali metal salt of the sulfur-containing organic compound, and a bivalent or further polyvalent metal salt of a sulfur-containing organic compound. On the occasion of the above mixing, an alkali metal salt of a sulfur-containing organic compound may be added separately.

Further, it is possible to produce the flame retardant by emulsion-polymerizing, in at least one stage, the monomer (B-3) comprising the polyfunctional monomer (B-2) containing at least two polymerizable unsaturated bonds within the molecule, and/or the vinyl monomer (B-4) in the presence of the polyorganosiloxane particles (B-1), and then carrying out the spray drying method with adding a bivalent or further polyvalent metal salt of a sulfur-containing organic compound during spray drying.

BEST MODE FOR CARRYING OUT THE INVENTION

The following examples illustrate the present invention more specifically. They are, however, by no means limitative of the scope of the invention. Hereinafter, "part(s)" means "part(s) by weight".

The measurements and tests in the following Examples and Comparative Examples were carried out in the following manner.

[Solid Matter Content]

Each latex was dried in a hot air drier at 120° C. for 2 hours, and the solid matter content was calculated as (weight of the residue after 2 hours of drying of the latex at 130° C.)/(latex weight before drying).

[Conversion of Monomers]

The conversion was calculated as (total charge (parts)× solid matter content−(emulsifier charged (parts)+inorganic acid and/or organic acid charged (parts)+radical polymerization initiator charged (parts)/(monomer(s) charged (parts)).

[Toluene Insoluble Matter Content]

A 0.5-g portion of the polyorganosiloxane particles in solid form as obtained by drying each latex was immersed in 80 ml of toluene at room temperature for 24 hours, followed by 60 minutes of centrifugation at 12,000 rpm. The toluene insoluble matter content of the polyorganosiloxane particles was measured and expressed in terms of weight percentage (%)

[Acetone Insoluble Matter Content]

One gram of each graft copolymer was immersed in 80 ml of acetone at room temperature for 48 hours, followed by 10 minutes of centrifugation at 18,000 rpm. The sediment fraction was measured as the acetone insoluble matter content of the graft copolymer.

[Volume Average Particle Diameter]

The volume average particle diameter of the polyorganosiloxane particles and of the graft copolymer was measured in a latex form. Using the measurement apparatus MICROTRAC UPA (product of Leed & Northrup Instruments), the volume average particle diameter (μm) and the variation coefficient in particle diameter distribution (standard deviation/volume average particle diameter (%)) were measured by the light scattering method.

[Impact Resistance]

The evaluation was made by the Izod test at −10° C. using notched ⅛ inch bars according to ASTM D-256.

[Flame Retardancy]

The evaluation was made by the UL94 V test. In the evaluation, 1.2-mm-thick specimens were also used in addition to 1.6-mm-thick ones.

[Anti-Blocking Property]

A 30-g portion of each graft copolymer composition in powder form was placed in a cylindrical vessel with a diameter of 50 mm, a load of 1 kg/cm² was applied to the powder at 4° C. for 3 hours to give a block. Using Hosokawa Micron Corporation's powder tester PEE, vibrations of 60 Hz were transmitted to the block for 100 seconds to disintegrate the same. The proportion of the powder fraction passing through a 18-mesh sieve to the total amount of the powder was determined. A higher numerical value indicates a higher level of anti-blocking property.

REFERENCE EXAMPLE 1

Production of Polyorganosiloxane Particles (S-1)

An emulsion was prepared by stirring an aqueous solution composed of the following components at 8,000 rpm for 5 minutes using a homomixer.

| Component | Amount (parts) |
| --- | --- |
| Pure water | 250 |
| Sodium dodecylbenzenesulfonate (SDBS) | 1.0 |
| Octamethylcyclotetrasiloxane (D4) | 97 |
| γ-Methacryloyloxypropyldimethoxymethylsilane | 3 |

This emulsion was charged, all at once, into a 5-nekced flask equipped with a stirrer, reflux condenser, nitrogen inlet, monomer addition inlet and thermometer. While stirring the system, 1 part (as solid) of a 10% aqueous solution of dodecylbenzenesulfonic acid (DBSA) was added, the temperature was raised to 80° C. over about 40 minutes and, then, the reaction was allowed to proceed at 80° C. for 10 hours. Thereafter, the reaction mixture was cooled to 25° C. and, after 20 hours of standing, the pH of the system was readjusted to 6.5 with sodium hydroxide and the polymerization was finished to give a latex containing polyorganosiloxane particles (S-1). The conversion of monomers, and the volume average particle diameter and toluene insoluble matter content of the polyorganosiloxane particle latex were measured. The results are shown in Table 1.

REFERENCE EXAMPLE 2

Production of Polyorganosiloxane Particles (S-2)

A 5-necked flask equipped with a stirrer, reflux condenser, nitrogen inlet, monomer addition inlet and thermometer was charged with:

| Component | Amount (parts) |
| --- | --- |
| Pure water | 186 |
| SDBS | 2 |

Then, the temperature was raised to 70° C. while purging the system with nitrogen, an aqueous solution composed of 4 parts of pure water and 0.1 part of potassium persulfate (KPS) was then added, followed by continuous addition, over 1 hour, of a mixture composed of:

| Component | Amount (parts) |
| --- | --- |
| Styrene (St) | 0.5 |
| Butyl acrylate (BA) | 1.5 |
| Tert-Dodecylmercaptan (t-DM) | 0.15. |

The mixture was stirred for 1 hour to complete the polymerization. A St-BA copolymer latex was thus obtained. The conversion of monomers was 99%. The latex obtained has a solid matter content of 2.0% and a volume average particle diameter of 0.02 μm. At that time, the variation coefficient was 39%. The St-BA copolymer had a toluene insoluble matter content of 0%.

Separately, a polyorganosiloxane-forming component emulsion was prepared by stirring a mixture composed of the following components at 8,000 rpm for 5 minutes using a homomixer.

| Component | Amount (parts) |
| --- | --- |
| Pure water | 70 |
| SDBS | 0.5 |
| D4 | 95 |
| Mercaptopropyldimethoxymethylsilane (MPDS) | 5 |

Then, the St-BA copolymer-containing latex was maintained at 80° C., 1.2 parts (as solid) of a 10% aqueous solution of DBSA was added and, then, the above polyorganosiloxane-forming component emulsion was added all at once. After 15 hours of continued stirring, the reaction mixture was cooled to 25° C. and allowed to stand for 25 hours. The pH was then adjusted to 6.4 with sodium hydroxide, and the polymerization was finished to give a latex containing polyorganosiloxane particles (S-2). The conversion of monomers, and the volume average particle diameter and toluene insoluble matter content of the polyorganosiloxane particle-containing latex were measured. The results are shown in Table 1. The polyorganosiloxane particles were composed of 98% by weight of the polyorganosiloxane component and 2% by weight of the St-BA copolymer component.

REFERENCE EXAMPLE 3

Production of Vinyl-Based Seed Particles (Sv-1)

The St-BA copolymer as produced in the course of production of the polyorganosiloxane particles (S-2) in Reference Example 2 was used as vinyl-based seed particles (Sv-1). The vinyl-based seed particles (Sv-1) was measured for volume average particle diameter and toluene insoluble matter content. The results are shown in Table 1.

TABLE 1

|  | Reference Example 1 | Reference Example 2 | Reference Example 3 |
|---|---|---|---|
| Polyorganosiloxane particles or vinyl-based seed particles | S-1 | S-2 | Sv-1 |
| Conversion of monomers of polyorganosiloxane component (%) | 87 | 87 | — |
| Average particle diameter (μm) | 0.17 | 0.29 | 0.02 |
| Variation coefficient (%) | 37 | 35 | 39 |
| Toluene insoluble matter content (%) | 0 | 0 | 0 |

REFERENCE EXAMPLES 4 TO 12

A 5-necked flask equipped with a stirrer, reflux condenser, nitrogen inlet, monomer addition inlet and thermometer was charged with 300 parts of pure water (inclusive of that portion derived from the polyorganosiloxane particle (B-1) latex), 0.4 part of sodium formaldehyde sulfoxylate (SFS), 0.01 part of disodium ethylenediaminetetraacetate (EDTA), 0.0025 part ferrous sulfate and the polyorganosiloxane particle (B-1) latex specified in Table 2. Under a nitrogen sweep, the temperature was raised to 50° C. while stirring the system. After arrival at 50° C., a mixture of the monomer (B-3) and radical polymerization initiator specified in Table 2 was added over the period specified in Table 2 and, then, stirring was continued at 50° C. for 1 hour. Thereafter, a mixture of the monomer (B-4) and radical polymerization initiator specified in Table 2 was further added dropwise over the period specified in Table 2. After completion of the adding the mixture, stirring was continued for 4 hours to give a graft copolymer latex. In Reference Examples 4 to 6, the addition of the monomer (B-3) mixture was omitted, and the monomer (B-4) mixture was added instead.

Then, the latex was diluted with pure water to a solid concentration of 15%, 2.5 parts (as solid) of a 2% aqueous solution of calcium chloride was added to give a coagulated slurry. The coagulated slurry was heated to 98° C. with stirring, then cooled to 50° C., dehydrated and dried in a hot air drier at 50° C. for 72 hours to give a polyorganosiloxane-containing graft copolymer (SG-1 to SG-9) in powder form. The conversion of monomers and the acetone insoluble matter content of each polymer are shown in Table 2.

TABLE 2

| | | Reference Example | | | | | | | | |
|---|---|---|---|---|---|---|---|---|---|---|
| | | 4 | 5 | 6 | 7 | 8 | 9 | 10 | 11 | 12 |
| Polyorganosiloxane particles (B-1) or vinyl-based seed particles (parts) | S-1 | 85 | 65 | 92 | — | — | — | — | — | — |
| | S-2 | — | — | — | 60 | 75 | 75 | 89 | 89 | 89 |
| | Sv-1 | — | — | — | — | — | — | — | — | — |
| Vinyl monomer (B-3) (parts) | AIMA | — | — | — | 3.8 | 3.8 | 3.8 | 1.9 | 1.9 | 1.9 |
| | BA | — | — | — | 0.2 | 0.2 | 0.2 | 0.1 | 0.1 | 0.1 |
| | CHP | — | — | — | — | — | — | — | — | 0.05 |
| | TBP | — | — | — | — | — | — | — | 0.06 | — |
| | TBPIPC | — | — | — | 0.12 | 0.12 | 0.11 | 0.06 | — | — |
| | Addition period (h) | — | — | — | All at once | All at once | All at once | All at once | All at once | All at once |
| Vinyl monomer (B-4) (parts) | MMA | 15 | 35 | 8 | 36 | — | 16 | 9 | 9 | 9 |
| | MA | — | — | — | — | — | 5 | — | — | — |
| | St | — | — | — | — | 15.8 | — | — | — | — |
| | AN | — | — | — | — | 5.3 | — | — | — | — |
| | CHP | 0.06 | 0.14 | 0.03 | — | — | — | — | — | 0.06 |
| | TBP | — | — | — | — | — | — | — | 0.1 | — |
| | TBPIPC | — | — | — | 0.4 | 0.6 | 0.2 | 0.1 | — | — |
| | Addition period (h) | 2 | 4 | 1 | 4 | 2 | 2 | 1 | 1 | 1 |
| SP of polymer (B-4) ((cal/cm$^3$)$^{1/2}$) | | 9.25 | 9.25 | 9.25 | 9.25 | 9.95 | 9.30 | 9.25 | 9.25 | 9.25 |
| Conversion (%) | (B-3) | — | — | — | 99 | 99 | 99 | 99 | 99 | 99 |
| | (B-4) | 99 | 100 | 98 | 99 | 99 | 99 | 99 | 98 | 100 |
| Acetone insoluble matter content (%) | | 96 | 88 | 98 | 90 | 91 | 95 | 99 | 98 | 97 |
| Graft polymer No. | | SG-1 | SG-2 | SG-3 | SG-4 | SG-5 | SG-6 | SG-7 | SG-8 | SG-9 |

| | | Reference Example | | | | | | | |
|---|---|---|---|---|---|---|---|---|---|
| | | 13 | 14 | 15 | 16 | 17 | 18 | 19 | 20 |
| Polyorganosiloxane particles (B-1) or vinyl-based seed particles (parts) | S-1 | — | — | — | — | — | — | — | — |
| | S-2 | — | — | — | — | — | — | 89 | 89 |
| | Sv-1 | 2 | 5 | 5 | 5 | — | — | — | — |
| Vinyl monomer (B-3) (parts) | AIMA | 2.8 | — | 0.9 | 5.7 | 1 | 1.9 | 1.9 | |
| | BA | 0.2 | — | 74.1 | 0.3 | 79 | 0.1 | 0.1 | |
| | CHP | — | — | — | — | — | — | — | |

TABLE 2-continued

| | | | | | | | | | | |
|---|---|---|---|---|---|---|---|---|---|---|
| | | TBP | — | — | — | — | — | — | — | — |
| | | TBPIPC | 0.09 | — | — | 0.4 | 0.18 | 0.4 | 0.06 | 0.06 |
| | | Addition period (h) | All at once | — | — | 10 (Dropwise addition) | All at once | 10 (Dropwise addition) | All at once | All at once |
| Vinyl monomer (B-4) (parts) | | MMA | 95 | 95 | — | 20 | 94 | 20 | 9 | 9 |
| | | MA | — | — | — | — | — | — | — | — |
| | | St | — | — | 71.3 | — | — | — | — | — |
| | | AN | — | — | 23.8 | — | — | — | — | — |
| | | CHP | — | — | — | — | — | — | — | — |
| | | TBP | — | — | — | — | — | — | — | — |
| | | TBPIPC | 0.6 | 0.6 | 0.8 | 0.2 | 0.6 | 0.2 | 0.1 | 0.1 |
| | | Addition period (h) | 10 | 10 | 10 | 2 | 10 | 2 | 1 | 1 |
| SP of polymer $((cal/cm^3)^{1/2})$ | (B-4) | | 9.25 | 9.25 | 9.95 | 9.25 | 9.25 | 9.25 | 9.25 | 9.25 |
| Conversion (%) | (B-3) | | 99 | — | — | 98 | 90 | 98 | 99 | 99 |
| | (B-4) | | 98 | 97 | 94 | 100 | 98 | 99 | 99 | 99 |
| Acetone insoluble matter content (%) | | | 12 | 8 | 10 | 91 | 15 | 92 | 98 | 98 |
| Graft polymer No. | | | SG'-1 | SG'-2 | SG'-3 | SG'-4 | SG'-5 | SG'-6 | SG'-7 | SG-10 |

In the table, AlMA stands for allyl methacrylate, BA for butyl acrylate, MA for methyl acrylate, MMA for methyl methacrylate, St for styrene, AN for acrylonitrile (all being monomers), CHP for cumene hydroperoxide, TBP for tert-butyl hydroperoxide, TBPIP for tert-butyl peroxyisopropylcarbonate (the above three being radical polymerization initiators), and "SP of polymer" for the value of the solubility parameter of the polymer of the vinyl monomer (B-4) as determined by the method described herein.

REFERENCE EXAMPLES 13 TO 15

Graft copolymers (SG'-1 to 3) each in a powder form were obtained in the same manner as in Reference Example 7 except that the vinyl-based seed particle (Sv-1) latex specified in Table 2 was used in lieu of the polyorganosiloxane particle (B-1) latex used in Reference Example 7, that the monomer (B-3) mixture and monomer (B-4) mixture used were as specified in Table 2, and that 0.1 part of sodium dodecylbenzenesulfonate (15% aqueous solution) was added at 2-hour intervals during dropwise addition of the monomer (B-4) mixture. In Reference Examples 14 and 15, the addition of the monomer (B-3) mixture was omitted and the monomer (B-4) mixture alone was added. For each Reference Example, the conversion of monomers and the acetone insoluble matter content are shown in Table 2.

REFERENCE EXAMPLE 16

A graft copolymer (SG'-4) was obtained in the same manner as in Reference Example 7 except that the vinyl-based seed particle (Sv-1) latex specified in Table 2 was used in lieu of the polyorganosiloxane particle (B-1) latex used in Reference Example 7, that the monomer (B-3) mixture and monomer (B-4) mixture used were as specified in Table 2, and that 0.1 part of sodium dodecylbenzenesulfonate (15% aqueous solution) was added at 2-hour intervals during dropwise addition of the monomer (B-3) mixture. The conversion of monomers and the acetone insoluble matter content are shown in Table 2.

REFERENCE EXAMPLE 17

A graft copolymer (SG'-5) was obtained in the same manner as in Reference Example 13 except that 0.5 part of sodium dodecylbenzenesulfonate (20% aqueous solution) was used in lieu of the vinyl-based seed particle (Sv-1) latex used in Reference Example 13 and that the monomer (B-3) mixture and monomer (B-4) mixture were as specified in Table 2. The conversion of monomers and the acetone insoluble matter content are shown in Table 2.

REFERENCE EXAMPLE 18

A graft copolymer (SG'-6) was obtained in the same manner as in Reference Example 16 except that 0.5 part of sodium dodecylbenzenesulfonate (20% aqueous solution) was used in lieu of the vinyl-based seed particle (Sv-1) latex used in Reference Example 16 and that the monomer (B-3) mixture and monomer (B-4) mixture were as specified in Table 2. The conversion of monomers and the acetone insoluble matter content are shown in Table 2.

REFERENCE EXAMPLE 19

A graft copolymer (SG'-7) was obtained in the same manner as in Reference Example 10 except that the same latex as the polyorganosiloxane-containing graft copolymer (SG-7) obtained in Reference Example 10 and that, on the isolation of graft copolymer from the latex, the coagulation with an aqueous solution of calcium chloride was not carried out but the spray drying method was carried out for isolation. The conversion of monomers and the acetone insoluble matter content of SG'-7 are shown in Table 2.

REFERENCE EXAMPLE 20

A graft copolymer (SG-10) was obtained in the same manner as in Reference Example 19 except that, in carrying out the spray drying method for isolation, 1 part (on the solid basis) of an aqueous dispersion of calcium dodecylbenzenesulfonate as prepared by adding dropwise a 10% aqueous solution of dodecylbenzenesulfonic acid (soft type) (product of Tokyo Kasei Kogyo) to a 10% aqueous dispersion of calcium hydroxide (product of Wako Pure Chemical Industries) to thereby adjust the pH to 4 was introduced into a spray drier separately from the latex and mixed drying was carried out in the spray drier. The conversion of monomers and the acetone insoluble matter content of SG-10 are shown in Table 2.

EXAMPLES 1 TO 9 AND COMPARATIVE EXAMPLES 1 TO 6

Rendering a Polycarbonate Resin Flame-Retardant

Using a polycarbonate resin (PC-1: Toughlon FN1900A, product of Idemitsu Petrochemical) and the polyorganosiloxane-containing graft copolymers (SG-1 to 9) obtained in Reference Examples 4 to 12 or the graft copolymers (SG'-1 to 6) obtained in Reference Examples 13 to 18, compositions were prepared according to the formulations shown in Table 3. Sodium dodecylbenzenesulfonate was used in the following manner: a 2% aqueous solution thereof was preliminarily incorporated in the polyorganosiloxane-containing graft copolymers (SG-1 to 9) or graft copolymers (SG'-1 to 6) in powder form according to the formulations shown in Table 3, followed by drying. The amounts of calcium dodecylbenzenesulfonate as shown in Table 3 are the values calculated on the assumption that the whole amounts of sodium dodecylbenzenesulfonate used as the emulsifier in the production of the polyorganosiloxane-containing graft copolymers (SG-1 to 9) or graft copolymers (SG'-1 to 6) had been converted to the calcium salt.

Each composition obtained was melt-kneaded at 270° C. in a twin-screw extruder (Japan Steel Works' TEX 44 SS) and pelletized. The pellets obtained were molded into ⅛-inch Izod test specimens and 1/16-inch and 1/20-inch test specimens for flame retardancy evaluation using FANUC's FAS 100 B injection molding machine set at a cylinder temperature of 300° C. The test specimens obtained were evaluated by the evaluation methods described above. The results obtained are shown in Table 3.

TABLE 3

| | | Example | | | | | | | |
|---|---|---|---|---|---|---|---|---|---|
| | | 1 | 2 | 3 | 4 | 5 | 6 | 7 | 8 |
| (A) Thermoplastic resin (parts) | PC-1 | 100 | 100 | 100 | 100 | 100 | 100 | 100 | 100 |
| (B) Polyorganosiloxane-containing graft copolymer (parts) | SG-1 | 3 | — | — | — | — | — | — | — |
| | SG-2 | — | 3 | — | — | — | — | — | — |
| | SG-3 | — | — | 3 | — | — | — | — | — |
| | SG-4 | — | — | — | 3 | — | — | — | — |
| | SG-5 | — | — | — | — | 3 | — | — | — |
| | SG-6 | — | — | — | — | — | 3 | — | — |
| | SG-7 | — | — | — | — | — | — | 3 | — |
| | SG-8 | — | — | — | — | — | — | — | 3 |
| | SG-9 | — | — | — | — | — | — | — | — |
| | SG'-1 | — | — | — | — | — | — | — | — |
| | SG'-2 | — | — | — | — | — | — | — | — |
| | SG'-3 | — | — | — | — | — | — | — | — |
| | SG'-4 | — | — | — | — | — | — | — | — |
| | SG'-5 | — | — | — | — | — | — | — | — |
| | SG'-6 | — | — | — | — | — | — | — | — |
| (C) Metal salt (parts) | SDBS | 0.01 | 0.01 | 0.01 | 0.01 | 0.01 | 0.01 | 0.01 | 0.01 |
| | CDBS | 0.06 | 0.05 | 0.07 | 0.08 | 0.10 | 0.10 | 0.12 | 0.12 |
| (D) Fluororesin (parts) | PTFE | 0.25 | 0.25 | 0.25 | 0.25 | 0.25 | 0.25 | 0.25 | 0.25 |
| Flame retardancy 1/16 inch | Total combustion time (s) | 18 | 21 | 9 | 25 | 23 | 18 | 12 | 18 |
| | Dripping | No | No | No | No | No | No | No | No |
| 1/20 inch | Total combustion time (s) | 39 | 49 | 32 | 48 | 48 | 42 | 29 | 40 |
| | Dripping | No | No | No | No | No | No | No | No |
| Impact resistance | −10° C. (kJ/m$^2$) | 32 | 28 | 30 | 27 | 29 | 34 | 30 | 31 |

| | | Example | Comparative Example | | | | | |
|---|---|---|---|---|---|---|---|---|
| | | 9 | 1 | 2 | 3 | 4 | 5 | 6 |
| (A) Thermoplastic resin (parts) | PC-1 | 100 | 100 | 100 | 100 | 100 | 100 | 100 |
| (B) Polyorganosiloxane-containing graft copolymer (parts) | SG-1 | — | — | — | — | — | — | — |
| | SG-2 | — | — | — | — | — | — | — |
| | SG-3 | — | — | — | — | — | — | — |
| | SG-4 | — | — | — | — | — | — | — |
| | SG-5 | — | — | — | — | — | — | — |
| | SG-6 | — | — | — | — | — | — | — |
| | SG-7 | — | — | — | — | — | — | — |
| | SG-8 | — | — | — | — | — | — | — |
| | SG-9 | 3 | — | — | — | — | — | — |
| | SG'-1 | — | 3 | — | — | — | — | — |
| | SG'-2 | — | — | 3 | — | — | — | — |
| | SG'-3 | — | — | — | 3 | — | — | — |
| | SG'-4 | — | — | — | — | 3 | — | — |
| | SG'-5 | — | — | — | — | — | 3 | — |
| | SG'-6 | — | — | — | — | — | — | 3 |
| (C) Metal salt (parts) | SDBS | 0.01 | 0.01 | 0.01 | 0.01 | 0.01 | 0.01 | 0.01 |
| | CDBS | 0.12 | 0.06 | 0.15 | 0.15 | 0.15 | 0.01 | 0.01 |
| (D) Fluororesin (parts) | PTFE | 0.25 | 0.25 | 0.25 | 0.25 | 0.25 | 0.25 | 0.25 |

TABLE 3-continued

| Flame retardancy | 1/16 inch | Total combustion time (s) | 22 | 231 | 158 | 203 | 221 | 258 | 214 |
|---|---|---|---|---|---|---|---|---|---|
| | | Dripping | No | Yes | Yes | Yes | Yes | Yes | Yes |
| | 1/20 inch | Total combustion time (s) | 49 | * | * | * | * | * | * |
| | | Dripping | No | Yes | Yes | Yes | Yes | Yes | Yes |
| Impact resistance | | −10° C. (kJ/m$^2$) | 29 | 6 | 6 | 4 | 28 | 5 | 30 |

*The moldings were not self-extinguishing but burnt out.

In the table, PTFE stands for polytetrafluoroethylene (Polyflon FA-500, product of Daikin Industries), SDBS for sodium dodecylbenzenesulfonate (Neopelex F-25, product of Kao Corp.), and CDBS for calcium dodecylbenzenesulfonate (resulting from conversion of the emulsifier used in the step of polymerization to the calcium salt).

EXAMPLES 10 TO 21 AND COMPARATIVE EXAMPLES 7 TO 9

Using polycarbonate resins (PC-1, PC-2: Toughlon FN 1700 A, product of Idemitsu Petrochemical) and the polyorganosiloxane-containing graft copolymer (SG-7) obtained in Reference Example 10, compositions were prepared according to the formulations given in Table 4. Potassium dodecylbenzenesulfonate was used in the following manner: a 10% aqueous solution of dodecylbenzenesulfonic acid (soft type) (product of Tokyo Kasei Kogyo) was neutralized to pH=6.5 with a 10% aqueous solution of potassium hydroxide (product of Wako Pure Chemical Industries), the resulting solution was diluted to a 2% aqueous solution, and this dilution was preliminarily incorporated in the polyorganosiloxane-containing graft copolymer (SG-7) according to the formulation shown in Table 4, like the sodium dodecylbenzenesulfonate in Example 7, followed by drying. As for the calcium dodecylbenzenesulfonate, the whole amounts of sodium dodecylbenzenesulfonate used as in the production of the polyorganosiloxane-containing graft copolymers (SG-7) was considered to have been converted to the calcium salt. In Example 20 alone, a powder of calcium dodecylbenzenesulfonate was separately prepared by adding dropwise a 10% aqueous solution of dodecylbenzenesulfonic acid (soft type) (product of Tokyo Kasei Kogyo) to a 10% aqueous dispersion of calcium hydroxide (product of Wako Pure Chemical Industries) and drying the resulting aqueous dispersion adjusted to pH=4, and 0.01 part of the powder was further added (the total amount being given in Table 4).

Thereafter, the procedure of Example 7 was followed, and the test specimens obtained were evaluated according to the evaluation methods described above. The results are shown in Table 4.

EXAMPLES 22 AND COMPARATIVE EXAMPLES 10

The same procedure as used in Example 10 was used except that the polyorganosiloxane-containing graft copolymer (SG-10) obtained in Reference Example 20 was used in lieu of the polyorganosiloxane-containing graft copolymer (SG-7) used in Example 10, that neither sodium dodecylbenzenesulfonate nor calcium dodecylbenzenesulfonate was further added, that the amount of sodium dodecylbenzenesulfonate used was estimated by calculating the sum of the sodium dodecylbenzenesulfonate used in the production of SG-10 and the product of neutralization of the dodecylbenzenesulfonic acid with sodium hydroxide, that the calcium dodecylbenzenesulfonate used in spray drying was used as such, and that the formulations given in Table 5 were employed. In Comparative Example 10 alone, a master batch was prepared by adding 0.5 part (as solid) of a 5% aqueous solution of sodium dodecylbenzenesulfonate to the polycarbonate resin PC-1 and drying the mixture, and this was diluted with PC-1 to give the composition specified in Table 5. The results are shown in Table 5.

TABLE 4

| | | Example | | | | | | | |
|---|---|---|---|---|---|---|---|---|---|
| | | 10 | 11 | 12 | 13 | 14 | 15 | 16 | 17 |
| (A) Thermoplastic resin (parts) | PC-1 | 100 | — | 100 | 100 | — | — | — | 100 |
| | PC-2 | — | 100 | — | — | 100 | 100 | 100 | — |
| (B) Polyorganosiloxane-containing graft copolymer (parts) | SG-7 | 3 | 3 | 1 | 8 | 3 | 3 | 3 | 3 |
| (C) Metal salt (parts) | PPFBS | — | — | — | — | 0.01 | — | — | — |
| | PDPSS | — | — | — | — | — | 0.01 | — | — |
| | SDBS | 0.01 | 0.01 | 0.01 | 0.01 | — | — | — | 0.01 |
| | PDBS | — | — | — | — | — | — | 0.01 | — |
| | CDBS | 0.12 | 0.12 | 0.04 | 0.31 | 0.12 | 0.12 | 0.12 | 0.12 |
| (D) Fluororesin (parts) | PTFE | 0.25 | 0.2 | 0.25 | 0.25 | 0.2 | 0.2 | 0.2 | 0.25 |
| (E) Antioxidant (parts) | TDBHIC | — | — | — | — | — | — | — | 0.4 |
| | TMHBB | — | — | — | — | — | — | — | 0.4 |
| | DLTP | — | — | — | — | — | — | — | — |
| Flame retardancy | 1.6 mm Total combustion time (s) | 18 | 21 | 20 | 16 | 19 | 25 | 24 | 12 |
| | Dripping | No | No | No | No | No | No | No | No |
| | 1.2 mm Total combustion time (s) | 39 | 48 | 41 | 38 | 42 | 50 | 49 | 28 |

TABLE 4-continued

| | | | | | | | | | |
|---|---|---|---|---|---|---|---|---|---|
| Impact resistance | Dripping | No | No | No | No | No | No | No | No |
| | −10° C. (kJ/m²) | 32 | 28 | 25 | 38 | 30 | 28 | 26 | 27 |

| | | Example | | | | Compar. Example | | |
|---|---|---|---|---|---|---|---|---|
| | | 18 | 19 | 20 | 21 | 7 | 8 | 9 |
| (A) Thermoplastic resin (parts) | PC-1 | 100 | 100 | — | — | 100 | 100 | 100 |
| | PC-2 | — | — | 100 | 100 | — | — | — |
| (B) Polyorganosiloxane-containing graft copolymer (parts) | SG-7 | 3 | 3 | 3 | 3 | — | 35 | 3 |
| (C) Metal salt (parts) | PPFBS | — | — | — | — | — | — | — |
| | PDPSS | — | — | — | — | — | — | — |
| | SDBS | 0.01 | — | — | — | 0.01 | 0.01 | 7 |
| | PDBS | — | — | — | — | — | — | — |
| | CDBS | 0.12 | 0.12 | 0.13 | 0.12 | — | 1.34 | 0.12 |
| (D) Fluororesin (parts) | PTFE | 0.25 | 0.25 | 0.2 | 0.2 | 0.25 | 0.25 | 0.25 |
| (E) Antioxidant (parts) | TDBHIC | 0.4 | — | — | — | — | — | — |
| | TMHBB | — | — | — | — | — | — | — |
| | DLTP | 0.4 | — | — | — | — | — | — |
| Flame retardancy 1.6 mm | Total combustion time (s) | 15 | 41 | 54 | 80 | 25 | 108 | ** |
| | Dripping | No | No | No | No | No | Yes | ** |
| 1.2 mm | Total combustion time (s) | 33 | 113 | 97 | 155 | 44 | 198 | ** |
| | Dripping | No | No | Yes | Yes | Yes | Yes | ** |
| Impact resistance | −10° C. (kJ/m²) | 23 | 34 | 24 | 24 | 7 | 39 | ** |

**No moldings could be obtained due to tanning of resin.

TABLE 5

| | | Example | | | Compar. Ex. 10 |
|---|---|---|---|---|---|
| | | 19 | 22 | 23 | |
| (A) Thermoplastic resin (parts) | PC-1 | 100 | 100 | 100 | 100 |
| (B) Polyorganosiloxane-containing graft copolymer (parts) | SG-7 | 3 | — | — | — |
| | SG-10 | — | 3 | 3 | — |
| (C) Metal salt (parts) | PPFBS | — | — | — | — |
| | PDPSS | — | — | — | — |
| | SDBS | — | 0.12 | 0.12 | 0.12 |
| | PDBS | — | — | — | — |
| | CDBS | 0.12 | 0.03 | 0.03 | — |
| (D) Fluororesin (parts) | PTFE | 0.25 | 0.25 | 0.25 | 0.25 |
| (E) Antioxidant (parts) | TDBHIC | — | — | 0.4 | — |
| | TMHBB | — | — | 0.4 | — |
| | DLTP | — | — | — | — |
| Flame retardancy 1.6 mm | Total combustion time (s) | 41 | 16 | 10 | 20 |
| | Dripping | No | No | No | No |
| 1.2 mm | Total combustion time (s) | 113 | 35 | 25 | 41 |
| | Dripping | No | No | No | Yes |
| Impact resistance | −10° C. (kJ/m²) | 34 | 31 | 28 | 6 |

In the tables, PPFBS stands for potassium perfluorobutanesulfonic acid (Megafac F-114, product of Dainippon Ink and Chemicals), PDPSS for potassium diphenyl sulfone-3-sulfonate (KSS, product of Seal Sands Chemicals), PDBS for potassium dodecylbenzenesulfonate, CDBS for calcium dodecylbenzenesulfonate, TDBHIC for tris(3,5-di-tert-butyl-4-hydroxybenyl) isocyanurate (Adekastab AO-20, product of Asahi Denka), TMHBB for 1,1,3-tris(2-methyl-4-hydroxy-5-tert-butylphenyl)butane (Adekastab AO-30, product of Asahi Denka), and DLTP for dilauryl thiodipropionate (DLTP "Yoshitomi", product of Yoshitomi Fine Chemicals).

EXAMPLES 24 AND 25 AND COMPARATIVE EXAMPLES 11 AND 12

Polyorganosiloxane-containing graft copolymer compositions comprising the polyorganosiloxane-containing graft copolymers (SG-7, SG-10, SG'-7) and sodium dodecylbenzenesulfonate and/or calcium dodecylbenzenesulfonate were prepared in the same manner as in Examples 7, 19 and 20. They were evaluated for anti-blocking property. These polyorganosiloxane-containing graft copolymer compositions were also evaluated for flame retardancy and impact resistance in the same manner as in Example 7. The results obtained are shown in Table 6.

TABLE 6

|  |  | Example | | Compar. Ex. | |
|---|---|---|---|---|---|
|  |  | 24 | 25 | 11 | 12 |
| (B) Polyorganosiloxane-containing graft copolymer (parts) | SG-7 | 3 | — | 3 | — |
|  | SG-10 | — | 3 | — | — |
|  | SG'-7 | — | — | — | 3 |
| (C) Metal salt (parts) | SDBS | 0.01 | 0.12 | — | 0.12 |
|  | CDBS | 0.12 | 0.03 | 0.12 | — |
| Flame retardancy 1.2 mm | Total combustion time (s) | 29 | 25 | 113 | 38 |
|  | Dripping | No | No | No | Yes |
| Anti-blocking property | Pass through a 18-mesh sieve | 96 | 78 | 96 | 32 |
| Impact resistance | −10° C. (kJ/m$^2$) | 30 | 28 | 34 | 27 |

From Tables 3 to 5, it is apparent that the flame-retardant thermoplastic resin compositions of the invention greatly improve the flame retardancy-impact resistance balance of polycarbonate resins. In particular, it is evident that even in the case of thin moldings (1.2-mm thick), which are hardly caused to manifest good flame retardancy by the prior art methods, the flame-retardant thermoplastic resin compositions of the invention show good flame retardancy.

From Table 6, it is apparent that the flame retardants for thermoplastic resins as provided by the invention can provide the thermoplastic resins with good flame retardancy and, further, are excellent in powder characteristics as represented by their anti-blocking property.

INDUSTRIAL APPLICABILITY

In accordance with the invention, flame-retardant thermoplastic resin compositions excellent in both flame retardancy and impact resistance, in particular capable of retaining good flame retardancy even in the form of thin moldings as well as flame retardants for thermoplastic resins which are excellent in flame retardancy-impact resistance balance and in powder characteristics as well can be obtained.

The invention claimed is:

1. A flame-retardant thermoplastic resin composition, which comprises:

100 parts by weight of a thermoplastic resin (A), 0.1 to 30 parts by weight of a polyorganosiloxane-containing graft copolymer (B) obtained by polymerizing, in at least one stage, monomer(s) (B-3) and a vinyl monomer (B-4) in the presence of polyorganosiloxane particles (B-1), wherein monomer(s) (B-3) comprises a polyfunctional monomer (B-2) containing at least two polymerizable unsaturated bonds within the molecule thereof, 0.0005 to 5 parts by weight of at least one metal salt (C) selected from the group consisting of alkali metal salts and bivalent or further polyvalent metal salts, and 0.05 to 2 parts by weight of a fluororesin (D), wherein the polyorganosiloxane-containing graft copolymer (B) is produced by polymerizing, in at least one stage, 1.5 to 10 parts by weight, per 100 parts by weight of the whole copolymer, of monomer(s) (B-3) comprising 100 to 20% by weight of a polyfunctional monomer (B-2) containing at least two polymerizable unsaturated bonds within the molecule thereof and 0 to 80% by weight of another copolymerizable monomer (B-5) in the presence of 40 to 95 parts by weight of polyorganosiloxane particles (B-1) and further polymerizing, in at least one stage, 5 to 50 parts by weight of a vinyl monomer (B-4).

2. The flame-retardant thermoplastic resin composition according to claim 1, wherein the thermoplastic resin (A) is a polycarbonate-based resin, the amount of the polyorganosiloxane-containing graft copolymer (B) is 0.5 to 20 parts by weight per 100 parts by weight of the polycarbonate-based resin, the metal salt (C) is an alkali metal salt of a sulfur-containing organic compound and/or a bivalent or further polyvalent metal salt of a sulfur-containing organic compound and the amount thereof in total is 0.001 to 5 parts by weight per 100 parts by weight of the polycarbonate-based resin.

3. The flame-retardant thermoplastic resin composition according to claim 2, wherein the metal salt (C) comprises both an alkali metal salt of a sulfur-containing organic compound and a bivalent or further polyvalent metal salt of a sulfur-containing organic compound.

4. The flame-retardant thermoplastic resin composition according to claims 1 or 2, wherein the bivalent or further polyvalent metal salt is an alkaline earth metal salt.

5. The flame-retardant thermoplastic resin composition according to claim 1, wherein the polyorganosiloxane-containing graft copolymer (B) is produced by polymerizing, in at least one stage, 1.5 to 8 parts by weight, per 100 parts by weight of the whole copolymer, of monomer(s) (B-3) comprising 100 to 20% by weight of a polyfunctional monomer (B-2) containing at least two polymerizable unsaturated bonds within the molecule thereof and 0 to 80% by weight of another copolymerizable monomer (B-5) in the presence of 40 to 95 parts by weight of polyorganosiloxane particles (B-1) and further polymerizing, in at least one stage, 5 to 50 parts by weight of a vinyl monomer (B-4).

6. The flame-retardant thermoplastic resin composition according to claims 1 or 2, wherein the polyorganosiloxane particles (B-1) has a volume average particle diameter of 0.008 to 0.6 μm.

7. The flame-retardant thermoplastic resin composition according to claims 1 or 2, wherein the polyorganosiloxane particles (B-1) are produced without using any tri- or further poly-functional silane.

8. The flame-retardant thermoplastic resin composition according to claims 1 or 2,
wherein the polyorganosiloxane particles (B-1) are in a latex form.

9. The flame-retardant thermoplastic resin composition according to claims 1 or 2,
wherein the vinyl monomer (B-4) is such one that a polymer derived from that monomer alone has a solubility parameter of 9.15 to 10.15 $(cal/cm^3)^{1/2}$.

10. The flame-retardant thermoplastic resin composition according to claims 1 or 2,
wherein the vinyl monomer (B-4) is at least one monomer selected from the group consisting of aromatic vinyl monomers, vinyl cyanide monomers, (meth)acrylic ester monomers and carboxyl group-containing vinyl monomers.

11. The flame-retardant thermoplastic resin composition according to claims 2 or 3,
wherein the sulfur-containing organic compound is at least one compound selected from the group consisting of sulfonamides, (alkyl)aromatic sulfonic acids, perfluoroalkanesulfonic acids, aliphatic sulfonic acids and diphenyl sulfone sulfonic acids.

12. The flame-retardant thermoplastic resin composition according to claim 11,
wherein the sulfur-containing organic compound is an (alkyl)aromatic sulfonic acid.

13. The flame-retardant thermoplastic resin composition according to claims 1 or 2,
which further comprises not more than 2 parts by weight of an antioxidant (E).

14. The flame-retardant thermoplastic resin composition according to claim 13,
wherein the antioxidant (E) comprises a combination of at least one antioxidant having the isocyanuric ring structure within the molecule thereof and at least one other antioxidant.

15. A flame retardant for thermoplastic resins, which comprises:
a polyorganosiloxane-containing graft copolymer (B) obtained by polymerizing, in at least one stage, monomer(s) (B-3) and a vinyl monomer (B-4) in the presence of polyorganosiloxane particles (B-1), wherein monomer(s) (B-3) comprises a polyfunctional monomer (B-2) containing at least two polymerizable unsaturated bonds within the molecule thereof,
an alkali metal salt of a sulfur-containing organic compound, and
a bivalent or further polyvalent metal salt of a sulfur-containing organic compound,
wherein the polyorganosiloxane-containing graft copolymer (B) is produced by polymerizing, in at least one stage, 1.5 to 10 parts by weight, per 100 parts by weight of the whole copolymer, of monomer(s) (B-3) comprising 100 to 20% by weight of a polyfunctional monomer (B-2) containing at least two polymerizable unsaturated bonds within the molecule thereof and 0 to 80% by weight of another copolymerizable monomer (B-5) in the presence of 40 to 95 parts by weight of polyorganosiloxane particles (B-1) and further polymerizing, in at least one stage, 5 to 50 parts by weight of a vinyl monomer (B-4).

16. The flame-retardant for thermoplastic resins according to claim 15,
wherein the polyorganosiloxane-containing graft copolymer (B) is produced by polymerizing, in at least one stage, 1.5 to 8 parts by weight, per 100 parts by weight of the whole copolymer, of monomer(s) (B-3) comprising 100 to 20% by weight of a polyfunctional monomer (B-2) containing at least two polymerizable unsaturated bonds within the molecule thereof and 0 to 80% by weight of another copolymerizable monomer (B-5) in the presence of 40 to 95 parts by weight of polyorganosiloxane particles (B-1) and further polymerizing, in at least one stage, 5 to 50 parts by weight of a vinyl monomer (B-4).

17. A method of producing flame-retardant thermoplastic resin composition, which comprises;
emulsion-polymerizing, in at least one stage, monomer(s) (B-3) and/or a vinyl monomer (B-4) in the presence of polyorganosiloxane particles (B-1), wherein monomer(s) (B-3) comprises a polyfunctional monomer (B-2) containing at least two polymerizable unsaturated bonds within the molecule thereof,
recovering the resulting polyorganosiloxane-containing graft copolymer containing a bivalent or further polyvalent metal salt of a sulfur-containing organic compound by the coagulation method,
adding a thermoplastic resin (A), an alkali metal salt of a sulfur-containing organic compound, and a fluororesin (D) to the polyorganosiloxane-containing graft copolymer containing the bivalent or further polyvalent metal salt of the sulfur-containing organic compound, and melt-kneading the mixture.

18. A method of producing flame retardant for thermoplastic resins,
which comprises:
emulsion-polymerizing, in at least one stage, monomer(s) (B-3) and/or a vinyl monomer (B-4) in the presence of polyorganosiloxane particles (B-1), wherein monomer(s) (B-3) comprises a polyfunctional monomer (B-2) containing at least two polymerizable unsaturated bonds within the molecule thereof,
recovering the polyorganosiloxane-containing graft copolymer containing a bivalent or further polyvalent metal salt of a sulfur-containing organic compound by the coagulation method,
adding an alkali metal salt of a sulfur-containing organic compound to the polyorganosiloxane-containing graft copolymer containing the bivalent or further polyvalent metal salt of the sulfur-containing organic compound, and blending them.

19. The method according to claims 17 or 18,
wherein the polyorganosiloxane-containing graft copolymer (B) is produced by polymerizing, in at least one stage, 1.5 to 10 parts by weight, per 100 parts by weight of the whole copolymer, of monomer(s) (B-3) comprising 100 to 20% by weight of a polyfunctional monomer (B-2) containing at least two polymerizable unsaturated bonds within the molecule thereof and 0 to 80% by weight of another copolymerizable monomer (B-5) in the presence of 40 to 95 parts by weight of polyorganosiloxane particles (B-1) and further polymerizing, in at least one stage, 5 to 50 parts by weight of a vinyl monomer (B-4).

* * * * *